(12) United States Patent
Kuffner, Jr.

(10) Patent No.: US 11,315,418 B2
(45) Date of Patent: Apr. 26, 2022

(54) PROVIDING USER ASSISTANCE IN A VEHICLE BASED ON TRAFFIC BEHAVIOR MODELS

(71) Applicant: Toyota Research Institute, Inc., Los Altos, CA (US)

(72) Inventor: James J. Kuffner, Jr., Saratoga, CA (US)

(73) Assignee: Toyota Research Institute, Inc., Los Altos, CA (US)

(*) Notice: Subject to any disclaimer, the term of this patent is extended or adjusted under 35 U.S.C. 154(b) by 298 days.

(21) Appl. No.: 16/527,911

(22) Filed: Jul. 31, 2019

(65) Prior Publication Data

US 2019/0355249 A1 Nov. 21, 2019

Related U.S. Application Data

(62) Division of application No. 15/645,539, filed on Jul. 10, 2017, now Pat. No. 10,431,081.

(51) Int. Cl.
*G05D 1/00* (2006.01)
*G08G 1/0962* (2006.01)
(Continued)

(52) U.S. Cl.
CPC ........... *G08G 1/0962* (2013.01); *B60W 40/09* (2013.01); *G08G 1/0125* (2013.01);
(Continued)

(58) Field of Classification Search
CPC ......... G05D 1/0088; G05D 2201/0213; G08G 1/161; G08G 1/096708; G08G 1/0962;
(Continued)

(56) References Cited

U.S. PATENT DOCUMENTS 8,005,616 B2 8/2011 Beuschel et al.
9,290,174 B1 3/2016 Zagorski
(Continued)

FOREIGN PATENT DOCUMENTS

| JP | 2005250564 A | 9/2005 |
| JP | 2015118438 A | 6/2015 |
| WO | 2016194300 A1 | 12/2016 |

*Primary Examiner* — Yuen Wong
(74) *Attorney, Agent, or Firm* — Christopher G. Darrow; Darrow Mustafa PC

(57) ABSTRACT

Providing user assistance in a vehicle includes identifying a driving behavior of the vehicle based on an evaluation of information about manual operation of the vehicle and information about an environment surrounding the vehicle, and issuing an alert to a user prompting the user to implement corrective manual operation. The user assistance further includes receiving a traffic behavior model that describes a predominating driving behavior of a like population of reference vehicles, and issuing the alert to a user prompting the user to implement corrective manual operation in response to identifying that the driving behavior of the vehicle does not match the predominating driving behavior of the like population of reference vehicles. Under the corrective manual operation, the driving behavior of the vehicle matches the predominating driving behavior of the like population of reference vehicles.

18 Claims, 12 Drawing Sheets

(51) Int. Cl.
*G08G 1/01* (2006.01)
*B60W 40/09* (2012.01)
*G09B 19/16* (2006.01)
*G09B 19/14* (2006.01)
*G09B 5/02* (2006.01)
*G09B 9/08* (2006.01)
*G09B 9/05* (2006.01)

(52) U.S. Cl.
CPC .............. *G08G 1/0137* (2013.01); *G09B 5/02* (2013.01); *G09B 9/05* (2013.01); *G09B 9/08* (2013.01); *G09B 19/14* (2013.01); *G09B 19/167* (2013.01)

(58) Field of Classification Search
CPC ........... G08G 1/096791; G08G 1/0133; G08G 1/0125; G08G 1/0137; G08G 1/096827; G08G 1/096725; G08G 1/163; G08G 1/166; G08G 1/0112; G08G 1/0116; B60W 40/09; B60W 2556/05; G09B 19/167; G09B 19/14; G09B 5/02; G01C 21/26

See application file for complete search history.

(56) References Cited

U.S. PATENT DOCUMENTS

| | | |
|---|---|---|
| 9,511,767 B1 | 12/2016 | Okumura et al. |
| 9,766,626 B1 | 9/2017 | Zhu et al. |
| 2010/0217483 A1 | 8/2010 | Matsuno |
| 2010/0222976 A1 | 9/2010 | Haug |
| 2010/0280710 A1 | 11/2010 | Staempfle et al. |
| 2012/0083960 A1* | 4/2012 | Zhu .................... G01C 21/3617 701/23 |
| 2013/0052614 A1 | 2/2013 | Mollicone et al. |
| 2014/0267734 A1 | 9/2014 | Hart, Jr. et al. |
| 2015/0149017 A1 | 5/2015 | Attard et al. |
| 2016/0068156 A1 | 3/2016 | Horii |
| 2016/0091897 A1 | 3/2016 | Nilsson et al. |
| 2016/0200317 A1 | 7/2016 | Danzl et al. |
| 2017/0101056 A1 | 4/2017 | Park |

* cited by examiner

PROVIDING USER ASSISTANCE IN A VEHICLE BASED ON TRAFFIC BEHAVIOR MODELS

CROSS REFERENCE TO RELATED APPLICATIONS

This application is a division of U.S. patent application Ser. No. 15/645,539, filed on Jul. 10, 2017, which is herein incorporated by reference in its entirety.

TECHNICAL FIELD

The embodiments disclosed herein generally relate to providing user assistance in vehicles, including vehicles with autonomous operation systems.

BACKGROUND

Some vehicles include an autonomous operation system under which the vehicle is subject to autonomous operation. In these so-called autonomous vehicles, a human driver may cede control over one or more primary control functions in favor of autonomous operation. In autonomous operation, the autonomous operation system generates a driving plan for maneuvering the vehicle on a roadway based on detected information about the environment surrounding the vehicle. To execute the driving plan, the autonomous operation system operates vehicle systems associated with the primary control functions over which the human driver has ceded control.

In autonomous vehicles, the capabilities of their autonomous operation systems may be leveraged to implement various safety technologies, such as pre-collision systems, blind spot monitors, lane keeping assistants and the like, to provide user assistance other than autonomous operation. This user assistance may, moreover, be provided in non-autonomous vehicles using the same or otherwise similar components typical of autonomous operation systems.

SUMMARY

Disclosed herein are embodiments of vehicles configured to provide user assistance, and methods of providing user assistance in vehicles, that involve using traffic behavior models as points of reference.

In one aspect, providing user assistance in a vehicle includes facets of perception and planning/decision making. A planning/decision making module may be used to receive a traffic behavior model that describes a predominating driving behavior of a like population of reference vehicles. While the vehicle is in the midst of manual operation, the planning/decision making module may also be used to issue, at at least one interface, prospective instructions to a user on how to make a driving behavior of the vehicle match the predominating driving behavior of the like population of reference vehicles. A perception module may be used to evaluate information about the manual operation of the vehicle and information about an environment surrounding the vehicle. A perception module may be used to identify the driving behavior of the vehicle based on the evaluation of the information about the manual operation of the vehicle and the information about the environment surrounding the vehicle. In response to identifying that the driving behavior of the vehicle does not match the predominating driving behavior of the like population of reference vehicles, the planning/decision making module may also be used once more to issue, at the least one interface, remedial instructions to the user on how to make the driving behavior of the vehicle match the predominating driving behavior of the like population of reference vehicles.

In another aspect, providing user assistance in a vehicle includes facets of perception and planning/decision making. A perception module may be used to evaluate information about manual operation of the vehicle and information about an environment surrounding the vehicle. The perception module may also be used to identify, based on the evaluation of the information about the manual operation of the vehicle and the information about the environment surrounding the vehicle, a driving behavior of the vehicle. A planning/decision making module may be used to receive a traffic behavior model that describes a predominating driving behavior of a like population of reference vehicles. In response to identifying that the driving behavior of the vehicle does not match the predominating driving behavior of the like population of reference vehicles, the planning/decision making module may also be used to issue, at at least one interface, an alert to a user prompting the user to implement corrective manual operation under which the driving behavior of the vehicle matches the predominating driving behavior of the like population of reference vehicles.

In yet another aspect, providing user assistance in a vehicle includes facets of perception and planning/decision making. While the vehicle is in the midst of manual operation, a perception module may be used to evaluate information about an environment surrounding the vehicle. The perception module may also be used to identify, based on the evaluation of the information about the environment surrounding the vehicle, a traffic behavior of an object in the environment surrounding the vehicle. A planning/decision making module may be used to receive a traffic behavior model that describes a predominating traffic behavior of a like population of reference objects. In response to identifying that the traffic behavior of the object does not match the predominating traffic behavior of the like population of reference objects, the planning/decision making module may also be used to issue, at at least one interface, an alert to a user prompting the user to implement defensive manual operation under which the traffic behavior of the object is addressed.

These and other aspects will be described in additional detail below.

BRIEF DESCRIPTION OF THE DRAWINGS

The various features, advantages and other uses of the present embodiments will become more apparent by referring to the following detailed description and drawing in which.

DETAILED DESCRIPTION

This disclosure teaches a vehicle with components typical of an autonomous operation system. The vehicle is informed by situationally-dependent traffic behavior models generated based on the identified traffic behaviors of reference objects. The traffic behavior models describe, among other things, predominating traffic behavior and atypical traffic behavior, including predominating driving behavior and atypical driving behavior. Thus informed, the vehicle provides assistance to a user of the vehicle. In one form of user assistance, a user is actively trained, using either prospective or remedial instructions, or both, to implement manual operation of the vehicle under which the vehicle's driving behavior matches the predominating driving behavior. In another form of user assistance, corrective manual operation of the vehicle is prompted, under which the vehicle's driving behavior matches the predominating driving behavior, when the driving behavior of the vehicle is atypical of the predominating driving behavior, or otherwise does not match the predominating driving behavior. In another form of user assistance, defensive manual operation of the vehicle is prompted when the traffic behavior of an object in the environment surrounding the vehicle is atypical of the predominating traffic behavior, or otherwise does not match the predominating traffic behavior.

Vehicle with an Autonomous Operation System

Figure 1:
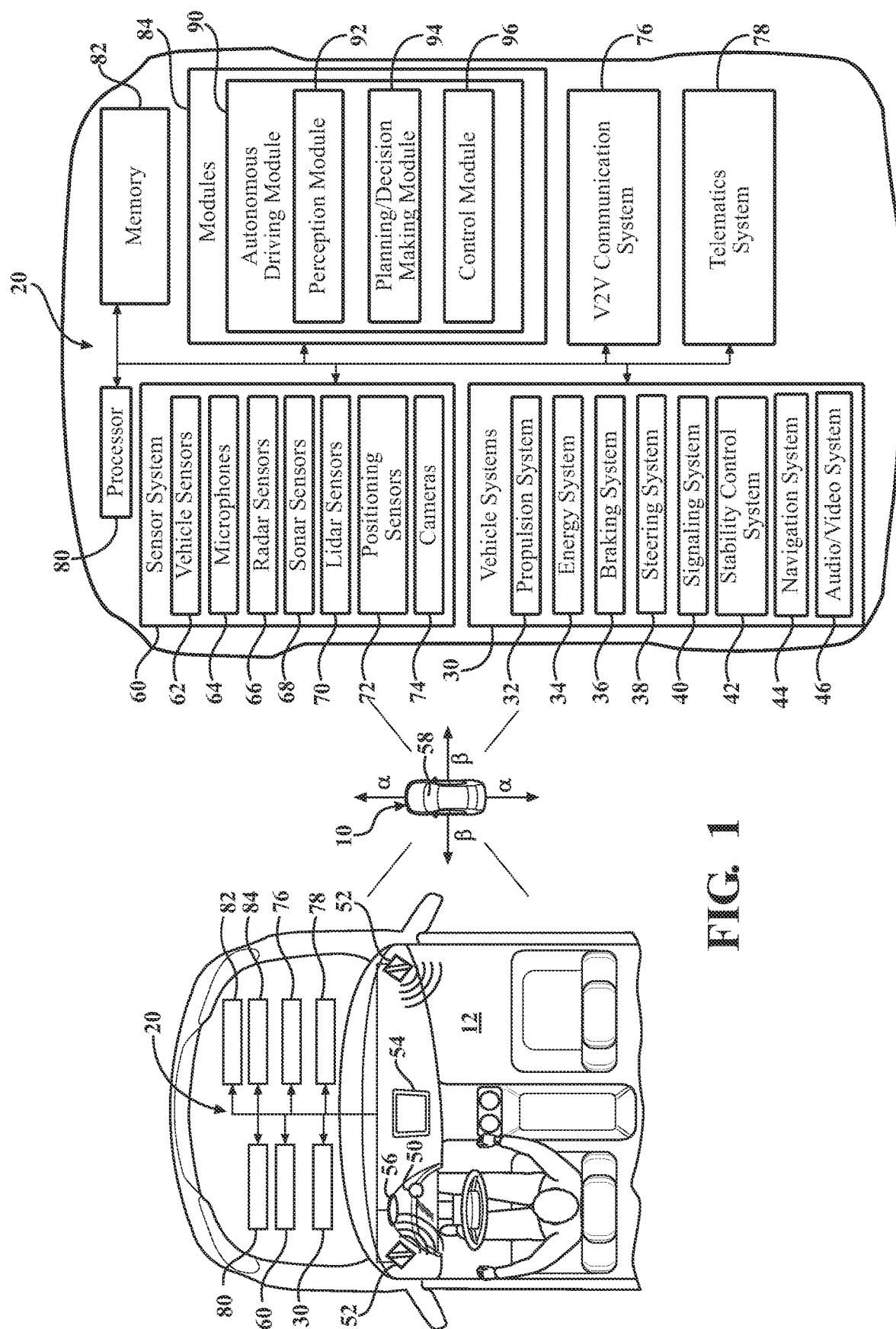
FIG. 1 includes top views of a vehicle, showing, via block diagrams, components of an autonomous operation system.

A representative vehicle 10 is shown in FIG. 1. The vehicle 10 has an exterior and a number of inner compartments. The inner compartments may include a passenger compartment 12, an engine compartment and, for the illustrated vehicle 10, a trunk.

The vehicle 10 may include, among other things, an engine, motor, transmission and other powertrain components housed in its engine compartment or elsewhere in the vehicle 10, as well as other powertrain components, such as wheels. The wheels support the remainder of the vehicle 10. One, some or all of the wheels may be powered by other powertrain components to drive the vehicle 10. One, some or all of the wheels may be steered wheels subject to having their steering angles adjusted to adjust the orientation of the vehicle 10.

The vehicle 10 includes an autonomous operation system 20 under which the vehicle 10 is, generally speaking, subject to autonomous operation. Under the autonomous operation system 20, the vehicle 10 may be semi-autonomous or highly automated, for instance.

Autonomous support systems. The autonomous operation system 20 includes various autonomous support systems that support autonomous operation of the vehicle 10. Although the autonomous support systems could be dedicated to the autonomous operation system 20, it is contemplated that some or all of the autonomous support systems may also support other functions of the vehicle 10, including its manual operation.

The autonomous support systems may be or include various vehicle systems 30. The vehicle systems 30 may include a propulsion system 32, an energy system 34, a braking system 36, a steering system 38, a signaling system 40, a stability control system 42, a navigation system 44 and an audio/video system 46, for example, as well as any other systems generally available in vehicles.

The propulsion system 32 includes components operable to accelerate the vehicle 10, as well as maintain its speed. The propulsion system 32 may include, for instance, the engine, motor, transmission and other powertrain components, as well as certain vehicle controls, such as a cruise control system. The energy system 34 includes components that control or otherwise support the storage and use of energy by the vehicle 10. The energy source employed by the energy system 34 may include, for instance, gasoline, natural gas, diesel oil and the like, as well as batteries, fuel cells and the like.

The braking system 36 includes components operable to decelerate the vehicle 10, such as brakes, for instance. The steering system 38 includes components operable to adjust the orientation of the vehicle 10 with respect to its longitudinal direction α or lateral direction β, or both, by, for example, adjusting the steering angle of one, some or all of the wheels. The signaling system 40 includes components operable to communicate driving intentions and other notifications to other vehicles and their users. The signaling system 40 may include, for instance, exterior lights such as headlights, a left-turn indicator light, a right-turn indicator light, a brake indicator light, a backup indicator light, taillights and a running light. The stability control system 42 includes components operable to maintain, among other aspects of the stability of the vehicle 10, its proper yaw and pitch, by, for example, actuating brakes and adjusting the power to one, some or all of the wheels powered by other powertrain components to drive the vehicle 10.

The navigation system 44 establishes routes and directions for the vehicle 10 using, for instance, digital maps. The navigation system 44 may itself include digital maps, or the navigation system 44 may connect to remote sources for digital maps. In the absence of the navigation system 44, the autonomous operation system 20 may connect to remote sources for routes and directions for the vehicle 10.

The audio/video system 46 includes components operable to serve as interfaces between users of the vehicle 10 and the vehicle 10 itself. The audio/video system 46 may include components operable to detect mechanical and verbal inputs received from a user of the vehicle 10 and transform those inputs into corresponding input signals. The audio/video system 46 may also include components operable to transform signals, such as signals representing media, into tactile, visual and sound outputs that may be sensed by a user of the vehicle 10. The audio/video system 46 may include, for instance, one or more microphones 50, one or more speakers 52, one or more displays 54 and a projector 56.

The microphones 50 are operable detect, among other sounds waves, verbal inputs from users of the vehicle 10, and transform those verbal inputs into corresponding input signals. The speakers 52 are operable to receive, among other signals, signals representing media from the remainder of the audio/video system 46 and the vehicle 10, and transform those signals into sound outputs that may be heard by users of the vehicle 10. The microphones 50 may be located within the passenger compartment 12 of the vehicle 10 at any location suitable for detecting verbal inputs from a user of the vehicle 10. Similarly, the speakers 52 may be located within the passenger compartment 12 of the vehicle 10 at any location suitable for its sound outputs to be heard by a user of the vehicle 10.

The displays 54 are operable to receive, among other signals, signals representing media from the remainder of the audio/video system 46 and the vehicle 10, and employ any of various display technologies to transform those signals into visual outputs at their surfaces that may be seen by users of the vehicle 10. The projector 56, similarly to the displays 54, is operable to receive, among other signals, signals representing media from the remainder of the audio/video system 46 and the vehicle 10, and employ any of various display technologies to transform those signals into visual outputs that may be projected onto surfaces, such as the surface of the windshield 58, that may be seen by users of the vehicle 10. The displays 54 may also include touch screens by which the displays 54 are operable to detect the presence and location of mechanical inputs from users of the vehicle 10 at their surfaces, and transform those mechanical inputs into corresponding input signals. The displays 54 may be configured, for example, to receive these mechanical inputs via their touch screens directly upon the visual outputs at their surfaces. The displays 54, similarly to the microphones 50 and the speakers 52, may be located within the passenger compartment 12 of the vehicle 10 any location suitable for their visual outputs to be seen by users of the vehicle 10, and for receiving mechanical inputs from users of the vehicle 10 via their touch screens.

In addition to the vehicle systems 30, the autonomous support systems may be or include a sensor system 60 including one or more sensors. The sensor system 60 and its sensors may be positioned anywhere in or on the vehicle 10, and may include existing sensors of the vehicle 10, such as backup sensors, lane keeping sensors and front sensors, for instance. In these and other configurations, the sensor system 60 and its sensors may detect information about the vehicle 10, including without limitation information about the operation of the vehicle 10, information about its passenger compartment 12 and information about the environment surrounding the vehicle 10. In the case of information about the environment surrounding the vehicle 10, the sensor system 60 and its sensors may detect information about the environment in front of and behind the vehicle 10 in its longitudinal direction $\alpha$, as well as to the sides of the vehicle 10 in its lateral direction $\beta$.

The sensor system 60 and its sensors may be configured to monitor in real-time, that is, at a level of processing responsiveness at which sensing is sufficiently immediate for a particular process or determination to be made, or that enables a processor to keep up with some external process.

The sensors of the sensor system 60 may include one or more vehicle sensors 62, one or more microphones 64, one or more radar sensors 66, one or more sonar sensors 68, one or more lidar sensors 70, one or more positioning sensors 72 and one or more cameras 74, for example, as well as any other sensors generally available in vehicles.

The vehicle sensors 62 are operable to detect information about the operation of the vehicle 10. The vehicle sensors 62 may include, for instance, speedometers, gyroscopes, magnetometers, accelerometers, barometers, thermometers, altimeters, inertial measurement units (IMUs) and controller area network (CAN) sensors. In these and other configurations of the vehicle sensors 62, the detected information about the operation of the vehicle 10 may include, for example, its location and motion, including its speed, acceleration, orientation, rotation, direction and the like, as well as elevation, temperature and the operational statuses of the vehicle systems 30 and their components.

The microphones 64 are operable detect sounds waves, and transform those sound waves into corresponding signals. Some microphones 64 may be located to detect sound waves within the passenger compartment 12 of the vehicle 10. These microphones 64 may be the same as, or auxiliary to, the microphones 50 of the audio/video system 46, and may be similarly located within the passenger compartment 12 of the vehicle 10. Other microphones 64 may be located to detect sound waves in the environment surrounding the vehicle 10. These microphones 64 may, accordingly, be at least partially exposed to the environment surrounding the vehicle 10.

The radar sensors 66, the sonar sensors 68 and the lidar sensors 70 are each mounted on the vehicle 10 and positioned to have a fields of view in the environment surrounding the vehicle 10, and are each, generally speaking, operable to detect objects in the environment surrounding the vehicle 10. More specifically, the radar sensors 66, the sonar sensors 68 and the lidar sensors 70 are each operable to scan the environment surrounding the vehicle 10, using radio signals in the case of the radar sensors 66, sound waves in the case of the sonar sensors 68 and laser signals in the case of the lidar sensors 70, and generate signals representing objects, or the lack thereof, in the environment surrounding the vehicle 10. Among other things about the objects, the signals may represent their presence, location and motion, including their speed, acceleration, orientation, rotation, direction and the like, either absolutely or relative to the vehicle 10, or both.

The positioning sensors 72 are operable to identify the position of the vehicle 10. The positioning sensors 72 may implement, in whole or in part, a GPS, a geolocation system or a local positioning system, for instance, or any combination of these. For implementing a GPS, the positioning sensors 72 may include GPS transceivers configured to determine a position of the vehicle 10 with respect to the Earth via its latitude and longitude and, optionally, its altitude.

The cameras 74 are operable to detect light or other electromagnetic energy from objects, and transform that electromagnetic energy into corresponding visual data signals representing objects, or the lack thereof. The cameras 74 may be, or include, one or more image sensors configured for capturing light or other electromagnetic energy. These image sensors may be, or include, one or more photodetectors, solid state photodetectors, photodiodes or photomultipliers, or any combination of these. In these and other configurations, the cameras 74 may be any suitable type, including without limitation high resolution, high dynamic range (HDR), infrared (IR) or thermal imaging, or any combination of these.

Some cameras 74 may be located to detect electromagnetic energy within the passenger compartment 12 of the vehicle 10. These cameras 74 may accordingly be located within the passenger compartment 12 of the vehicle 10. Other cameras 74 may be located to detect electromagnetic energy in the environment surrounding the vehicle 10. These cameras 74 may be mounted on the vehicle 10 and positioned to have fields of view individually, or collectively, common to those of the radar sensors 66, the sonar sensors 68 and the lidar sensors 70 in the environment surrounding the vehicle 10, for example.

In addition to the vehicle systems 30 and the sensor system 60, the autonomous support systems may include a vehicle-to-vehicle (V2V) communication system 76 and a telematics system 78.

The V2V communication system 76 is operable to establish wireless communication with like V2V communication systems in other vehicles in the environment surrounding the vehicle 10. The V2V communication system 76 wirelessly transmits information about the vehicle 10, including its state and information detected by the sensor system 60 and its sensors, to other vehicles in the environment surrounding the vehicle 10. Similarly, the V2V communication system 76 wirelessly receives the same or similar information about other vehicles in the environment surrounding the vehicle 10 from their like V2V communication systems. The V2V communication system 76 may implement dedicated short range communication (DSRC), for instance, or other kinds of wireless communication.

The telematics system 78 is operable to establish wireless communication with remote computing devices, such as servers. The telematics system 78 wirelessly transmits information about the vehicle 10, including its state and information detected by the sensor system 60 and its sensors, to remote computing devices. The telematics system 78 also wirelessly receives any variety of information from remote computing devices. The telematics system 78 may implement Internet or cellular communication, for instance, to establish wireless communication with remote computing devices over the Internet or a cellular network, as the case may be, or other kinds of wireless communication.

ECU or other computing device. In addition to its autonomous support systems, the autonomous operation system 20 includes one or more processors 80, a memory 82 and one or more modules 84. Together, the processors 80, the memory 82 and the modules 84 constitute a computing device to which the vehicle systems 30, the sensor system 60, the V2V communication system 76, the telematics system 78 and any other autonomous support systems are communicatively connected. Although this computing device could be dedicated to the autonomous operation system 20, it is contemplated that some or all of its processors 80, its memory 82 and its modules 84 could also be configured as parts of a central control system for the vehicle 10, such as a central electronic control unit (ECU).

The processors 80 may be any components configured to execute any of the processes described herein or any form of instructions to carry out such processes or cause such processes to be performed. The processors 80 may be implemented with one or more general-purpose or special-purpose processors. Examples of suitable processors 80 include microprocessors, microcontrollers, digital signal processors or other forms of circuitry that can execute software. Other examples of suitable processors 80 include without limitation central processing units (CPUs), array processors, vector processors, digital signal processors (DSPs), field-programmable gate arrays (FPGAs), programmable logic arrays (PLAs), application specific integrated circuits (ASICs), programmable logic circuitry or controllers. The processors 80 can include at least one hardware circuit (e.g., an integrated circuit) configured to carry out instructions contained in program code. In arrangements where there are multiple processors 80, the processors 80 can work independently from each other or in combination with one another.

The memory 82 is a non-transitory computer readable medium. The memory 82 may include volatile or non-volatile memory, or both. Examples of suitable memory 82 includes RAM (Random Access Memory), flash memory, ROM (Read Only Memory), PROM (Programmable Read-Only Memory), EPROM (Erasable Programmable Read-Only Memory), EEPROM (Electrically Erasable Programmable Read-Only Memory), registers, magnetic disks, optical disks, hard drives or any other suitable storage medium, or any combination of these. The memory 82 includes stored instructions in program code. Such instructions can be executed by the processors 80 or the modules 84. The memory 82 may be part of the processors 80 or the modules 84, or may be communicatively connected the processors 80 or the modules 84.

The modules 84 are employable to perform various tasks in the vehicle 10. Generally speaking, the modules 84 include instructions that may be executed by the processors 80. The modules 84 can be implemented as computer readable program code that, when executed by the processors 80, execute one or more of the processes described herein. Such computer readable program code can be stored on the memory 82. The modules 84 may be part of the processors 80, or may be communicatively connected the processors 80.

Autonomous driving module. The modules 84 may include, for example, an autonomous driving module 90. The autonomous driving module 90 generates driving plans for maneuvering the vehicle 10 on roadways based on the information about the vehicle 10, including information detected by the sensor system 60 and its sensors, and executes the driving plans by operating the appropriate vehicle systems 30. In this so-called autonomous operation of the vehicle 10, its human driver will have ceded control over one or more primary control functions in favor of autonomous operation. These primary control functions may include propulsion, or throttle, braking or steering, for instance, or any combination of these. The vehicle systems 30 operated by the autonomous driving module 90 include those associated with the primary control functions over which the human driver has ceded control.

Among other sub-modules, the autonomous driving module 90 may include a perception module 92, a planning/decision making module 94 and a control module 96.

The perception module 92 gathers and evaluates information about the vehicle 10, including information detected by the sensor system 60 and its sensors and information about other vehicles communicated from the V2V communication system 76, as well as information sourced from digital maps. In the case of information about the environment surrounding the vehicle 10, the perception module 92 may, as part of its evaluation, identify objects in the environment surrounding the vehicle 10, including their properties. These properties may include, among other things about the objects, their presence, location and motion, including their speed, acceleration, orientation, rotation, direction and the like, either absolutely or relative to the vehicle 10, or both. In cases where these objects are other vehicles, the perception module 92 may additionally, or alternatively, identify these things, as well as the states of the other vehicles, from the information about the other vehicles communicated from the V2V communication system 76.

The perception module 92 may discriminate between different objects and individually track different objects over time. Either on initial detection or after tracking them over time, the perception module 92 may classify objects to account not only for roadways, features of roadways, such as lane markings, and obstacles on or around roadways, such as other vehicles, but also for surrounding ground, pedestrians, bicycles, construction equipment, road signs, buildings, trees and foliage, for instance.

Either alone or in combination with its identification and classification of objects in the environment surrounding the vehicle 10, the perception module 92 may identify the location of the vehicle 10 in the environment surrounding the vehicle 10. For example, the perception module 92 may implement localization techniques that match identified objects in the environment surrounding the vehicle 10, as well as their properties, to those reflected in digital maps as part of an overall 3D road network. The autonomous driving module 90 may itself include digital maps, for instance, or the perception module 92 may connect to the navigation system 44 or to remote sources for digital maps. Implementing these or other localization techniques, the perception module 92 may identify, among other aspects about the location of the vehicle 10 in the environment surrounding the vehicle 10, the location of the vehicle 10 on roadways.

The planning/decision making module 94, based on the evaluation of the information about the vehicle 10 by the perception module 92, generates driving plans for maneuvering the vehicle 10 on roadways. The driving plans may be, more specifically, for performing driving maneuvers. The driving plans may be part of, or augment, larger but otherwise analogous and similarly generated driving plans for maneuvering the vehicle 10 on roadways.

The driving plans may account for any objects in the environment surrounding the vehicle 10, as well as their properties, for example. Particularly in the case of obstacles on or around roadways, the driving plans may account for their predicted future maneuvering along the roadways. Accordingly, as part of its generation of driving plans, the planning/decision making module 94 may predict the future maneuvering of obstacles along roadways. The predicted future maneuvering of an obstacle along a roadway may be based on its presence, location and motion, as identified by the perception module 92, as well as how the perception module 92 classifies the obstacle and tracks it over time.

The driving plans themselves, as well as underlying predictions of the future maneuvering of obstacles along roadways, may also account for different lane positions and traffic rules, such as speed limits, priorities at intersections and roundabouts, stop line positions and the like. The autonomous driving module 90 may itself include digital maps reflecting these lane positions and traffic rules as part of an overall 3D road network, for instance, or the planning/decision making module 94 may connect to the navigation system 44 or to remote sources for digital maps.

The control module 96 operates the appropriate vehicle systems 30 to execute the driving plans generated by the planning/decision making module 94. The control module 96 may send control signals to the vehicle systems 30 or may directly send control signals to actuators that operate their components, or both.

Modeling the Traffic Behavior of Reference Objects

Figure 2:
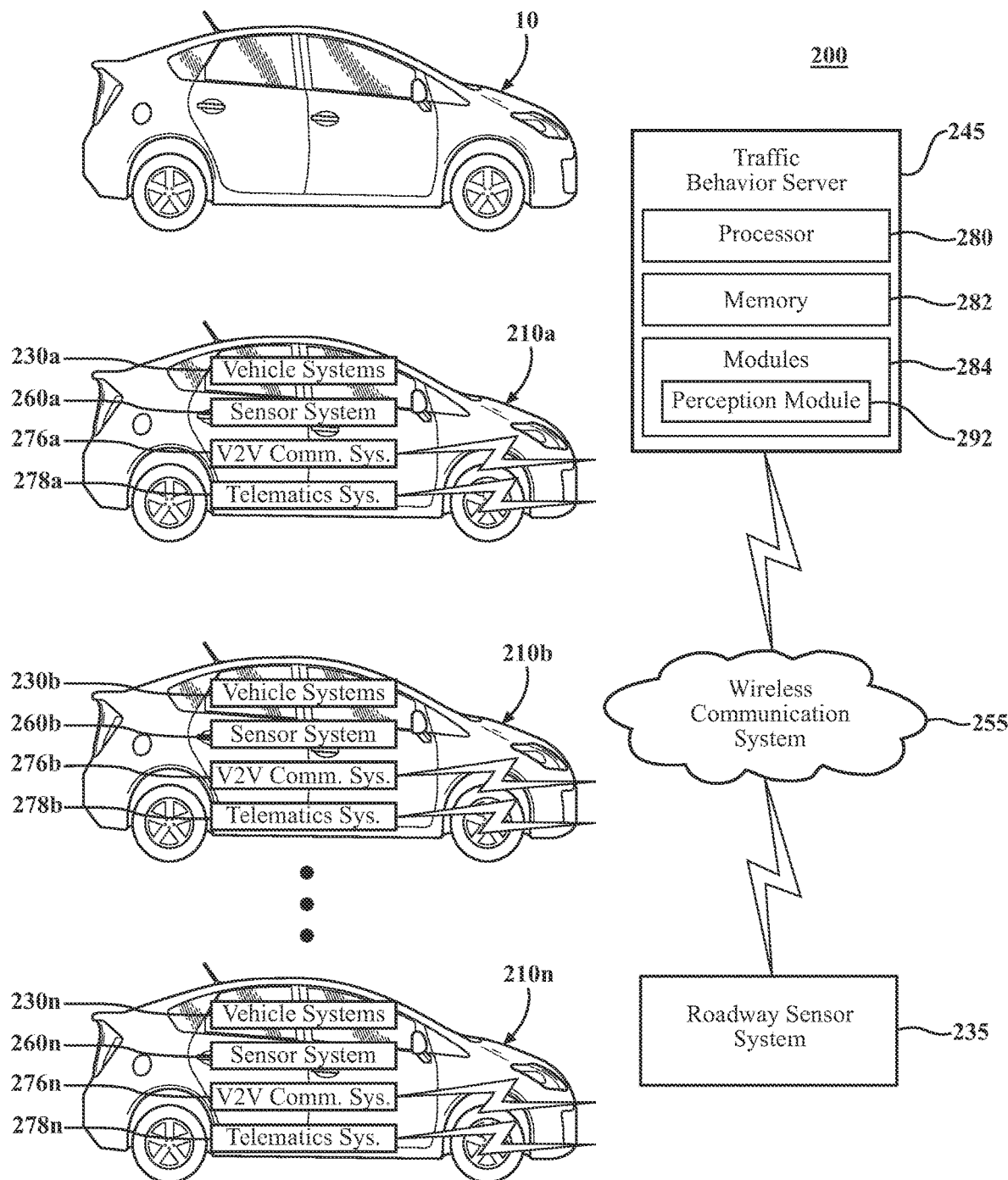
FIG. 2 is a diagram of a system for modeling the traffic behavior of reference objects.
Figure 3:
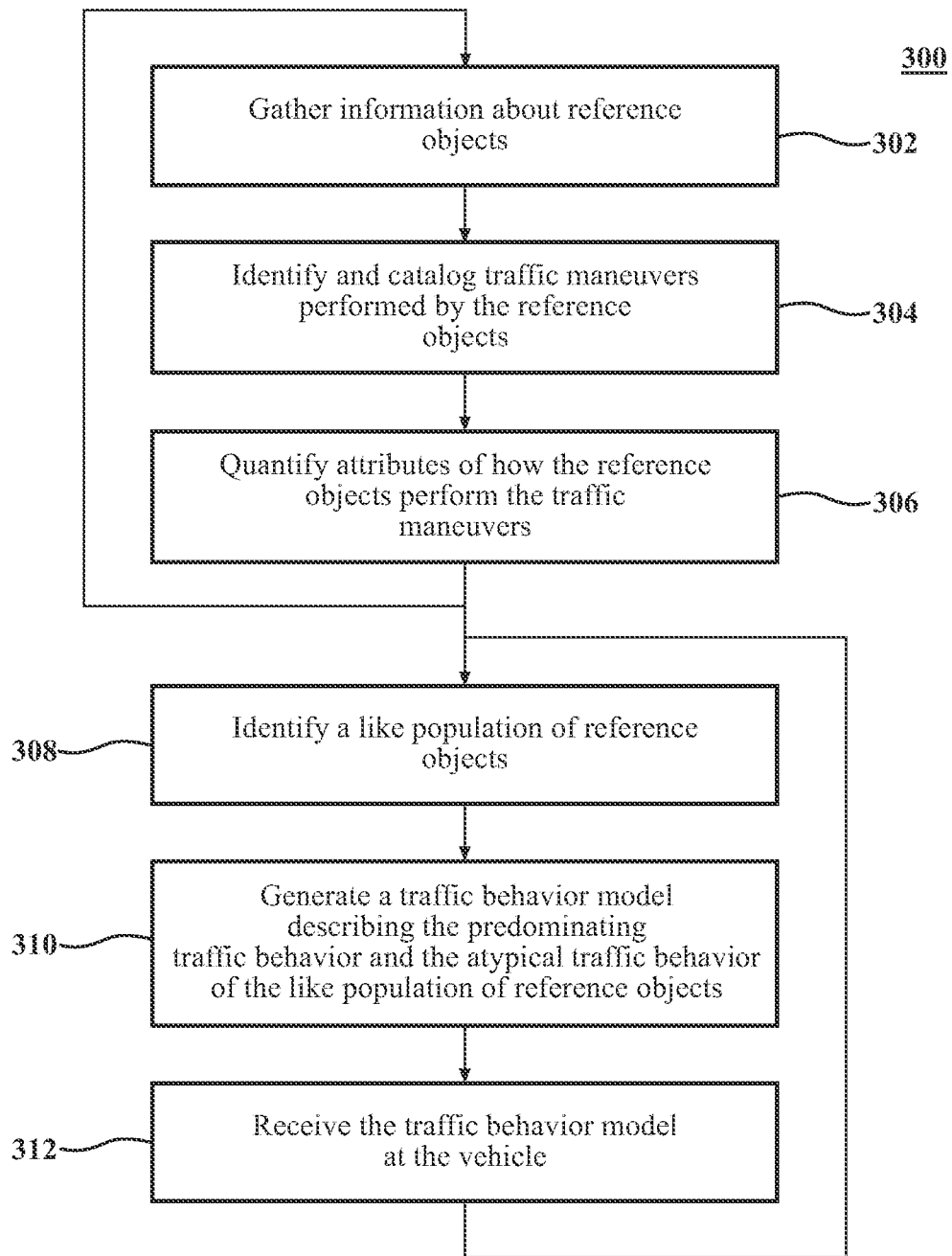
FIG. 3 is a flowchart showing the operations of a process by which the system for modeling the traffic behavior of reference objects generates traffic behavior models that describe, among other things, predominating driving behavior and other predominating traffic behavior.

A system 200 for modeling the traffic behavior of reference objects is shown in FIG. 2. The system 200 supports the operations of a process 300 shown in FIG. 3 that involves using information about reference objects to identify their traffic behavior and generate traffic behavior models.

System overview. The reference objects include any combination reference vehicles (e.g., cars, trucks, motorcycles and the like), reference bicycles, reference pedestrians, reference animals and any other objects that are controlled in traffic. Reference vehicles and reference bicycles could, for instance, be manually operated or, in other words, manually driven and ridden, respectively. Reference vehicles could also, for instance, be autonomously operated or, in other words, autonomously driven. Reference pedestrians and reference animals are, on the other hand, self-ambulated.

To support the generation of robust traffic behavior models, the number of reference objects is as large as possible. In any event, the reference objects include various like populations of reference objects as later-identified objects in the environment surrounding the vehicle 10, as well as at least one like population of reference vehicles as the vehicle 10.

For purposes of detecting the information about the reference objects, the system 200 includes any combination of the vehicle 10 itself, detection vehicles 210a-n (collectively, the detection vehicles 210) and a roadway sensor system 235. The reference objects are, accordingly, objects in the respective environments surrounding the vehicle 10, the detection vehicles 210 and the roadway sensor system 235. The detection vehicles 210 also serve as reference objects and, more specifically, as reference vehicles. The information the about reference objects used to generate the traffic behavior models may span any amount of time up to and including a current time. Accordingly, this information may be either historical or real-time, or both.

For purposes of gathering the information the about reference objects for evaluation, the system 200 includes any combination of the vehicle 10 and a traffic behavior server 245. The system 200 also includes a wireless communication system 255, such as the Internet or a cellular network, by which wireless communication is established with the traffic behavior server 245.

The detection vehicles 210 are equipped, in whole or in part, similarly to the vehicle 10. The detection vehicles 210 include various respective vehicle systems 230a-n (collectively, the respective vehicle systems 230), and respective sensor systems 260a-n (collectively, the respective sensor systems 260). The respective vehicle systems 230 are operationally and otherwise similar to the vehicle systems 30 in the vehicle 10. Likewise, the respective sensor systems 260 are operationally and otherwise similar to the sensor system 60 in the vehicle 10. The respective sensor systems 260 are accordingly operable to detect information about the environments surrounding the detection vehicles 210, including information about reference objects, such as their presence, location and motion, as well as information about the environments surrounding the reference objects. The respective sensor systems 260 are also operable to detect, among other information about the detection vehicles 210, information about the operation of the detection vehicles 210, such as their location and motion.

The respective vehicle systems 230 and the respective sensor systems 260 may, like their counterparts in the vehicle 10, be included in the detection vehicles 210 as autonomous support systems. In any event, one, some or all of the respective vehicle systems 230 and the respective sensor systems 260 may support, among other functions of the detection vehicles 210, their manual operation.

The detection vehicles 210 also include respective V2V communication systems 276*a-n* (collectively, the respective V2V communication systems 276), and respective telematics systems 278*a-n* (collectively, the respective telematics systems 278). The respective V2V communication systems 276 are operationally and otherwise similar to the V2V communication system 76 in the vehicle 10, and the respective telematics systems 278 are operationally and otherwise similar to the telematics system 78 in the vehicle 10.

If the detection vehicles 210 are in the environment surrounding the vehicle 10, the respective V2V communication systems 276, similarly to their counterparts in the vehicle 10, wirelessly transmit information about the detection vehicles 210 to the vehicle 10. Accordingly, in their role as reference objects, information about the detection vehicles 210 is both detected by the sensor system 60 and communicated from the respective V2V communication systems 276 as part of a larger collection of information about the vehicle 10 and, more specifically, as part of a larger collection of information about the environment surrounding the vehicle 10. The respective telematics systems 278, like their counterparts in the vehicle 10, wirelessly transmit information about the detection vehicles 210 to remote computing devices, such as the traffic behavior server 245, via the wireless communication system 255.

The roadway sensor system 235 includes one or more sensors positioned anywhere on or along roadways that reference objects are on. The roadway sensor system 235 and its sensors are operationally and otherwise similar to the sensor system 60 and its sensors in the vehicle 10. The roadway sensor system 235 may accordingly include, for example, any combination of radar sensors, sonar sensors, lidar sensors, positioning sensors and cameras that are each operable to generate signals representing information about the environment surrounding the roadway sensor system 235, including information about reference objects, such as their presence, location and motion, as well as information about the environments surrounding the reference objects.

The roadway sensor system 235 is operable to establish wireless communication with remote computing devices, such as servers. The roadway sensor system 235 may implement Internet or cellular communication, for instance, to establish wireless communication with remote computing devices over the Internet or a cellular network, as the case may be, or other kinds of wireless communication. Accordingly, the roadway sensor system 235 wirelessly transmits information about reference objects to remote computing devices, such as the traffic behavior server 245, via the wireless communication system 255.

The traffic behavior server 245 includes one or more processors 280, a memory 282 and one or more modules 284, including a perception module 292, that together constitute a computing device. The processors 280, the memory 282, the modules 284 generally and the perception module 292 specifically are operationally and otherwise similar to the processors 80, the memory 82, the modules 84 and the perception module 92, respectively, in the vehicle 10.

In the system 200, the vehicle 10 and the traffic behavior server 245 are in mutual communication both with each other, and with the detection vehicles 210 and the roadway sensor system 235. In the process 300, the information about the reference objects may be gathered for evaluation either by the perception module 92 in the vehicle 10, or by the perception module 292 in the traffic behavior server 245, or both. Moreover, any number of evaluation tasks may be shared between the perception module 92 and the perception module 292. Accordingly, the evaluation tasks in operations 304-310 are described as being performed by the perception modules 92, 292.

Notwithstanding, in some implementations, the process 300 may be performed onboard the vehicle 10. In one such onboard implementation, the reference objects, including detection vehicles 210 serving as reference objects, are limited to those in the environment surrounding the vehicle 10. In this onboard implementation, the information about the reference objects is sourced either from the vehicle 10 or from the detection vehicles 210, or both, and the gathering and evaluation tasks in operations 302-310 are performed in real-time by the perception module 92 in the vehicle 10.

Identifying the traffic behaviors of the reference objects. As a prerequisite to generating traffic behavior models, the information about the reference objects is gathered by the perception modules 92, 292 in operation 302. In operations 304 and 306, this information is evaluated by the perception modules 92, 292 to identify the traffic behaviors of the reference objects. These parts of the process 300 repeat, so that the traffic behavior models are continuously updated with new information about the reference objects.

In their prerequisite evaluation of the information about the reference objects, the perception modules 92, 292, in operation 304, identify and catalog the traffic maneuvers performed by the reference objects. These traffic maneuvers are driving maneuvers, for reference vehicles, biking maneuvers, for reference bicycles, and walking maneuvers, for reference pedestrians and reference animals. In operation 306, the perception modules 92, 292 quantify attributes of how the reference objects perform the traffic maneuvers.

Among other information about the reference objects, the traffic maneuvers performed by the reference objects are identified from their location and motion, as well as from information about the environments surrounding the reference objects. In the case of information about the environments surrounding the reference objects, the identification of the traffic maneuvers performed by the reference objects is informed by information sourced from digital maps, including different lane positions and traffic rules, as well as the location and motion of objects in the environments surrounding the reference objects, including obstacles such as vehicles.

In cases where the information about the reference objects is sourced from either the vehicle 10 or the roadway sensor system 235, or both, the perception modules 92, 292 may identify and track the reference objects, classify them, and identify their location and motion. In these cases, the perception modules 92, 292 may similarly identify, track and classify objects in the environments surrounding the reference objects, including obstacles such as vehicles, and identify their location and motion. For a given detection vehicle 210 in its role as a reference object, such obstacles may include other detection vehicles 210. In cases where the information about the reference objects is sourced from the detection vehicles 210 in their roles as reference objects, the sourced information may already include the location and motion of the detection vehicles 210 for identification by the perception modules 92, 292. In these cases, for a given detection vehicle 210 in its role as a reference object, similar information about other detection vehicles 210 may be the basis for identifying them as obstacles in the environment surrounding the detection vehicle 210, as well as for identifying their location and motion.

Most of the traffic maneuvers performed by the reference objects will be pre-defined standard traffic maneuvers. For reference vehicles and their driving maneuvers, standard driving maneuvers may be, or include, traversing intersections, including right-hand turning and left-hand turning through intersections, mergers, lane changes and takeovers, for instance. Particularly in cases of manual operation, some of the traffic maneuvers performed by the reference objects will be non-standard traffic maneuvers. For reference vehicles and their driving maneuvers, non-standard driving maneuvers may be, or include, overtaking double-parked vehicles, U-turning through intersections and left-hand turning through intersections, when first in line, ahead of traffic moving in the opposite direction, for instance. In many cases, non-standard traffic maneuvers will be specific to certain populations of reference objects.

To support the generation of situationally-dependent traffic behavior models, the traffic maneuvers performed by the reference objects are cataloged. The traffic maneuvers performed by the reference objects may be cataloged by the type of reference object (e.g., vehicle, bicycle, pedestrian and animal), any sub-types of the reference object (e.g., for a reference vehicle, car, truck, motorcycle, etc.), operation (e.g., manual or autonomous for a reference vehicle), location, time of day, roadway conditions, traffic conditions and weather conditions, for instance, or any combination of these.

Either alone or in combination with their identification and cataloging of the traffic maneuvers performed by the reference objects, the perception modules 92, 292 quantify one or more attributes of how the reference objects perform the traffic maneuvers.

The attributes of how the reference objects perform the traffic maneuvers are objective and quantifiable. These attributes may include the trajectories (i.e., driving paths, for vehicles, biking paths, for bicycles, and walking paths, for pedestrians and animals) of the reference objects along roadways associated with their performance of the traffic maneuvers. These attributes may also include the speed, acceleration and orientation of the reference objects along roadways, for instance, associated with their performance of the traffic maneuvers.

The attributes of how the reference objects perform the traffic maneuvers may moreover include relationships between the reference objects and the environments surrounding the reference objects associated with their performance of the traffic maneuvers. The environments surrounding the reference objects includes different lane positions and traffic rules, as well as objects in the environments surrounding the reference objects. Accordingly, these relationships include things such as lane offsets, proximity to objects on roadways and approach to objects on roadways, for instance.

Generating traffic behavior models. In operations 308 and 310, the perception modules 92, 292 generate one or more traffic behavior models. Each traffic behavior model describes both predominating traffic behavior and atypical traffic behavior. For a given traffic behavior model, the predominating traffic behavior is the predominating traffic behavior of a like population of reference objects. The atypical traffic behavior, on the other hand, is traffic behavior atypical of the predominating traffic behavior of the like population of reference objects.

The traffic behavior models are used as points of reference for various objects in the environment surrounding the vehicle 10, as well as for the vehicle 10 itself. The like population of reference objects, and related aspects of a given traffic behavior model, depend on the point of reference for which it is used.

Generally speaking, for an object in the environment surrounding the vehicle 10, a traffic behavior model is one that describes the predominating traffic behavior and the atypical traffic behavior of a like population of reference objects as the object. More specifically, for another vehicle, a traffic behavior model describes the predominating driving behavior and the atypical driving behavior of a like population of reference vehicles. For a bicycle, a traffic behavior model describes the predominating biking behavior and the atypical biking behavior of a like population of reference bicycles. And, for a pedestrian or an animal, a traffic behavior model describes the predominating walking behavior and the atypical walking behavior of a like population of reference pedestrians or reference animals, as the case may be.

For the vehicle 10 itself, a traffic behavior model describes the predominating driving behavior and the atypical driving behavior of a like population of reference vehicles. Such a traffic behavior model may be the same as or different from the one used as a point of reference for another vehicle in the environment surrounding the vehicle 10, and vice versa.

A given traffic behavior model may be dedicated to describing the predominating traffic behavior and the atypical traffic behavior of a like population of reference objects as a particular object in the environment surrounding the vehicle 10, or may describe these things as part (e.g., a sub-model) of a larger traffic behavior model that describes additional traffic behaviors. Likewise, a given traffic behavior model may be dedicated to describing the predominating driving behavior and the atypical driving behavior of a like population of reference vehicles as the vehicle 10, or may describe these things as part (e.g., a sub-model) of a larger traffic behavior model that describes additional driving behaviors or other traffic behaviors.

Operations 308 and 310 are included in a repeating part of the process 300. Accordingly, the traffic behavior models are generated on an object-by-object basis for the objects in the environment surrounding the vehicle 10. Also, for both the objects in the environment surrounding the vehicle 10 and the vehicle 10 itself, each traffic behavior model describes both predominating traffic behavior and atypical traffic behavior with reference to a like population of reference objects. As a result, the traffic behavior models are situationally-dependent. Specifically, as the vehicle 10 encounters new situations while being maneuvered on roadways, the traffic behavior models are continuously updated, replaced or otherwise regenerated to refer to new like populations of reference objects, as well as their predominating traffic behaviors and atypical traffic behaviors. The traffic behavior models may, for instance, be regenerated as the vehicle 10 encounters any combination of switches between manual and autonomous operation, new locations, new times of day, new roadway conditions, new traffic conditions and new weather conditions.

Predominating traffic behavior falls within a larger window of rule abiding, safe and otherwise feasible traffic behavior. The window of feasible traffic behavior usually allows for traffic behaviors ranging from cautious to aggressive. Atypical traffic behavior may or may not fall within this window.

Notwithstanding the range of feasible traffic behavior and, in particular, driving behavior, according to this disclosure, the driving behavior of the vehicle 10 may not only fall within the window of feasible driving behavior, but may also match the predominating driving behavior of a like population of reference vehicles. Various benefits may be realized as a result. For example, when its driving behavior matches the predominating driving behavior, the future maneuvering of the vehicle 10 along roadways will be rightly predicted, both on behalf of the users of other vehicles in the environment surrounding the vehicle 10, and on behalf of the other vehicles themselves. The users of the other vehicles will also perceive the vehicle 10 as being predictable and, as a result, will not become uncomfortable with it. Even if the users of the other vehicles are not disposed to becoming uncomfortable with the vehicle 10 as a result of its perceived unpredictability, they will at least not become tiresome of the vehicle 10, or exhibit more aggressive driving behavior toward the vehicle 10 as a result. Additionally, when its driving behavior matches the predominating driving behavior, the vehicle 10 will not miss opportunities to perform driving maneuvers.

All of these benefits flow from obviating problems that would otherwise happen in cases where the driving behavior of the vehicle 10, although falling within the window of feasible driving behavior, does not moreover match the predominating driving behavior of a like population of reference vehicles. As indicated above, these problems could include wrongful predictions of the future maneuvering of the vehicle 10, perceptions of unpredictability and resulting uncomfortableness with the vehicle 10, tiresomeness and resulting more aggressive driving behavior toward the vehicle 10, and missed opportunities for the vehicle 10 to perform driving maneuvers. Notably, many of these problems would otherwise happen not only in cases where the driving behavior of the vehicle 10 is too aggressive compared to the predominating driving behavior, but also in cases where the driving behavior of the vehicle 10 is too cautious.

Various benefits may also be realized because, according to this disclosure, the vehicle 10 is aware when the manual driving behavior of the vehicle 10 is atypical of the predominating driving behavior of a like population of reference vehicles, or otherwise does not match the predominating driving behavior of the like population of reference vehicles. The vehicle 10 may pass this awareness to its user in the context of the predominating driving behavior. Relatedly, with this awareness, the vehicle 10 may timely prompt appropriate corrective operation of the vehicle 10, under which its driving behavior matches the predominating driving behavior, either by its user via manual operation, or by itself via autonomous operation.

Various benefits may be also realized because, according to this disclosure, the vehicle 10 is aware, on an object-by-object basis, of the predominating traffic behaviors and the atypical traffic behaviors of like populations of reference objects as objects in the environment surrounding the vehicle 10. The vehicle 10 may pass this awareness to its user, for example, in the form of predictions of the future maneuvering of the objects along roadways reached by extrapolating the predominating traffic behaviors. The vehicle 10 is further aware when the traffic behaviors of objects in the environment surrounding the vehicle 10 are atypical of the predominating traffic behaviors, or otherwise do not match the predominating traffic behaviors. The vehicle 10 may pass this awareness to its user in the context of the predominating traffic behaviors. Relatedly, with this awareness, the vehicle 10 may timely prompt appropriate defensive operation of the vehicle 10, under which the traffic behaviors of the objects are addressed, either by its user via manual operation, or by itself via autonomous operation.

In operation 308, the perception modules 92, 292 identify an appropriate like population of reference objects. The identification of the like population of reference objects is based on the cataloging of the traffic maneuvers performed by the reference objects.

Generally speaking, for an object in the environment surrounding the vehicle 10, the like population of reference objects consists of those of the reference objects situated the same as or otherwise similarly to the object for purposes of performing traffic maneuvers. These traffic maneuvers are driving maneuvers, for vehicles, biking maneuvers, for bicycles, and walking maneuvers, for pedestrians and animals. For the vehicle 10 itself, the like population of reference objects is a like population of reference vehicles that consists of those of the reference vehicles situated the same as or otherwise similarly to the vehicle 10 for purposes of performing driving maneuvers.

For an object in the environment surrounding the vehicle 10, the like population of reference objects could, for instance, be those of the reference objects in the same location as the object. In other words, the like population of reference objects could be a local population of reference objects. The location may be one geographic area or any combination of geographic areas, at any varying level of granularity, such as city, municipality, neighborhood, roadway, intersection and the like. Additionally, or alternatively, the like population of reference objects could be any combination of those of the reference objects, for instance, maneuvering on roadways at the same time of day as the object, maneuvering on roadways under the same roadway conditions as the object, maneuvering on roadways under the same traffic conditions as the object and maneuvering on roadways under the same weather conditions as the object. Additionally, or alternatively, the like population of reference objects could be those of the reference objects, for instance, having the same sub-type as the object (e.g., car, truck, motorcycle, etc. in the case of other vehicles). Additionally, or alternatively, for other vehicles, the like population of reference vehicles could be those of the reference vehicles, for instance, under the same manual or autonomous operation, as the case may be, as the other vehicles. It will be understood that aspects of the situation of the vehicle 10 (e.g., location, time of day, roadway conditions, traffic conditions, weather conditions, etc.) may be used as proxies for corresponding aspects of the situations of the objects in the environment surrounding the vehicle 10.

For the vehicle 10, the like population of reference vehicles could, for instance, be those of the reference vehicles in the same location as the vehicle 10. In other words, the like population of reference vehicles could be a local population of reference vehicles. The location may, once again, be one geographic area or any combination of geographic areas, at any varying level of granularity, such as city, municipality, neighborhood, roadway, intersection and the like. Additionally, or alternatively, the like population of reference vehicles could be any combination of those of the reference vehicles, for instance, maneuvering on roadways at the same time of day as the vehicle 10, maneuvering on roadways under the same roadway conditions as the vehicle 10, maneuvering on roadways under the same traffic conditions as the vehicle 10 and maneuvering on roadways under the same weather conditions as the vehicle 10. Additionally, or alternatively, the like population of reference vehicles could be those of the reference vehicles, for instance, having the same sub-type as the vehicle 10 (e.g., car, truck, motorcycle, etc.). Additionally, or alternatively, while the vehicle 10 is in the midst of manual operation, the like population of reference vehicles could be those of the reference vehicles, for instance, likewise under manual operation.

In operation 310, the perception modules 92, 292 generate a traffic behavior model. The traffic behavior model, as part of its description of the predominating traffic behavior of a like population of reference objects, describes the traffic maneuvers performed by the like population of reference objects, as well as the predominating attributes of how the like population of reference objects performs the traffic maneuvers. The traffic behavior model, as part of its description of the traffic behavior atypical of the predominating traffic behavior of the like population of reference objects, describes the atypical attributes of how the like population of reference objects performs the traffic maneuvers, as well as the traffic maneuvers not performed by the like population of reference objects. Accordingly, in operation 310, the perception modules 92, 292 identify these things and incorporate their descriptions into the traffic behavior model.

The traffic maneuvers performed by the like population of reference objects may include, for instance, those that are performed by the like population of reference objects at or above a predetermined rate or frequency. These traffic maneuvers will include most if not all standard traffic maneuvers, and possibly, depending on the overall traffic behavior of the like population of reference objects, some non-standard traffic maneuvers. The traffic maneuvers not performed by the like population of reference objects, on the other hand, will include any remaining standard traffic maneuvers, as well as any non-standard traffic maneuvers performed by the like population of reference objects but not at or above the predetermined rate or frequency.

The attributes of how the like population of reference objects performs the traffic maneuvers may be predominating if, for instance, the attributes are the statistically median among those of the like population of reference objects associated with its performance of the traffic maneuvers. On the other hand, the attributes of how the like population of reference objects performs the traffic maneuvers may be atypical if, for instance, the attributes are statistically outlying among those of the like population of reference objects associated with its performance of the traffic maneuvers.

Accordingly, the traffic behavior model may be statistical, and describe, for the traffic maneuvers performed by the like population of reference objects, the statistically median traffic behavior of the like population of reference objects and, more specifically, the statistically median attributes of how the like population of reference objects performs the traffic maneuvers. The statistical traffic behavior model also describes the statistically outlying traffic behavior of the like population of reference objects and, more specifically, the statistically outlying attributes of how the like population of reference objects performs the traffic maneuvers.

In the statistical traffic behavior model, the predominating attributes of how the like population of reference objects performs a given traffic maneuver could include the statistically median path (i.e., driving path, for reference vehicles, biking path, for reference bicycles, and walking path, for reference pedestrians and reference animals), speed, acceleration and orientation of the like population of reference objects along roadways, for instance, associated with its performance of the traffic maneuver. The predominating attributes of how the like population of reference objects performs the traffic maneuver could moreover include the statistically median lane offsets, the statistically median proximity to obstacles on roadways and the statistically median approach to obstacles on roadways, for instance, associated with its performance of the traffic maneuver.

On the other hand, the atypical attributes of how the like population of reference objects performs a given traffic maneuver could include the statistically outlying path (i.e., driving path, for reference vehicles, biking path, for reference bicycles, and walking path, for reference pedestrians and reference animals), speed, acceleration and orientation of the like population of reference objects along roadways, for instance, associated with its performance of the traffic maneuver. The atypical attributes of how the like population of reference objects performs the traffic maneuver could moreover include the statistically outlying lane offsets, the statistically outlying proximity to obstacles on roadways and the statistically outlying approach to obstacles on roadways, for instance, associated with its performance of the traffic maneuver.

Any given statistically median or otherwise predominating attribute of how the like population of reference objects performs a traffic maneuver may be expressed in the traffic behavior model, in whole or in part, as a value, multiple values, a range of values and the like, for instance. Matching a given statistically median or otherwise predominating attribute of how the like population of reference objects performs a traffic maneuver could, for instance, involve a corresponding value being the same as or otherwise substantially similar to a value or one of multiple values, or being within or substantially within a range of values, as the case may be, expressed in the traffic behavior model.

Similarly, any given statistically outlying or otherwise atypical attribute of how the like population of reference objects performs a traffic maneuver may be expressed in the traffic behavior model, in whole or in part, as a value, multiple values, a range of values and the like, for instance. Matching a given statistically outlying or otherwise atypical attribute of how the like population of reference objects performs a traffic maneuver could, for instance, involve a corresponding value being the same as or otherwise substantially similar to a value or one of multiple values, or being within or substantially within a range of values, as the case may be, expressed in the traffic behavior model.

The traffic behavior model is received at the vehicle 10 in operation 312. If operations 304-310 are performed in whole or in part off board the vehicle 10, the traffic behavior model is transmitted to the vehicle 10 in operation 312. In onboard implementations of the process 300, where the process 300 is performed onboard the vehicle 10, operation 312 may be inherent in the remainder of the process 300 or in other processes when the traffic behavior model is ultimately received at the planning/decision making module 94.

Providing User Assistance Based on Traffic Behavior Models

The vehicle 10, informed by traffic behavior models, is equipped to provide a variety of assistance to a user of the vehicle 10. Processes for providing user assistance are described with reference to the vehicle 10 as being a host vehicle equipped with the autonomous operation system 20. Although the vehicle 10 is subject to autonomous operation under the autonomous operation system 20, these processes may also leverage its components to provide user assistance that does not include autonomous operation of the vehicle 10.

Figure 4:
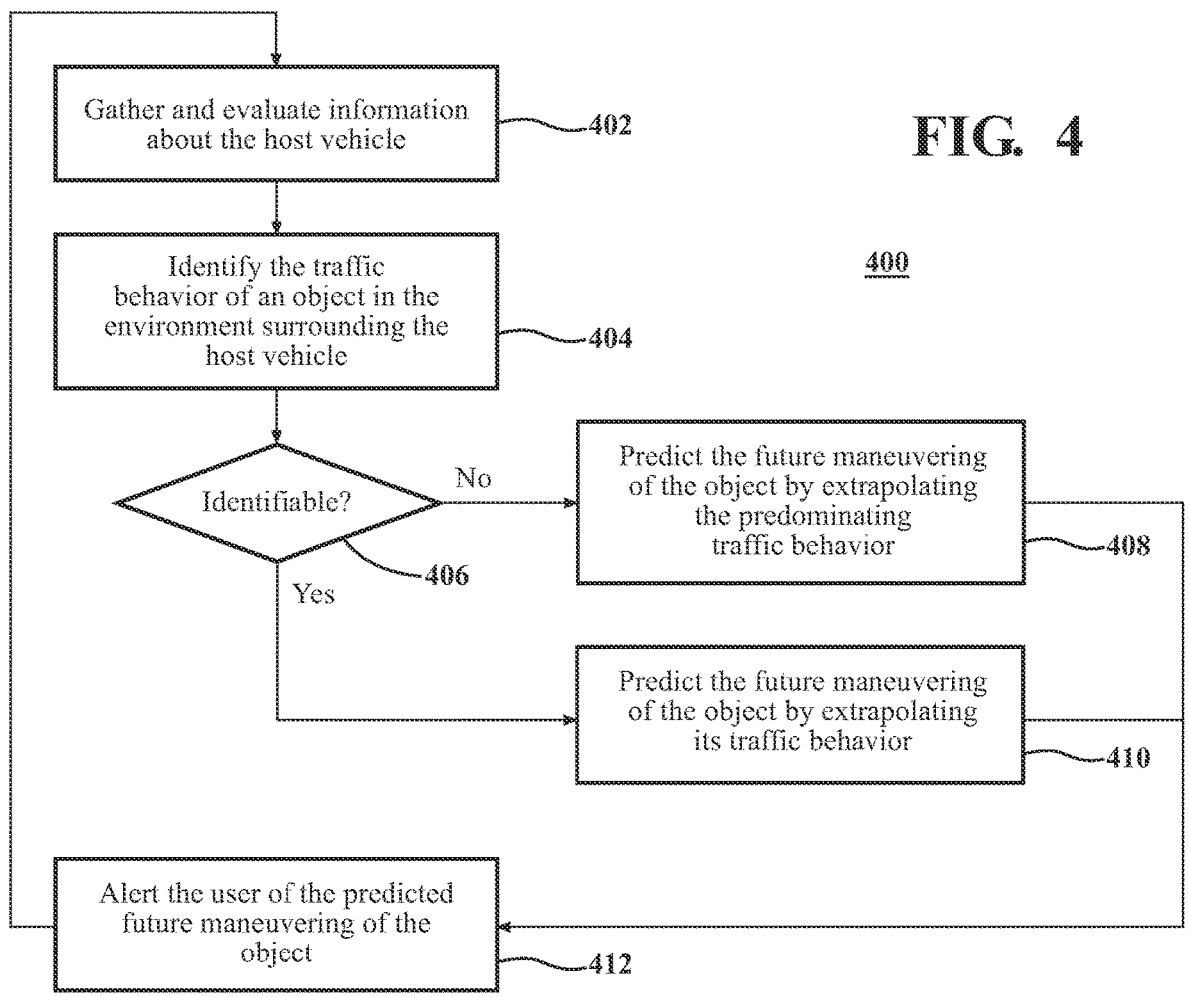
FIG. 4 is a flowchart showing the operations of a process by which the autonomous operation system predicts the future maneuvering of an object in the environment surrounding the vehicle by extrapolating the predominating traffic behavior described in a traffic behavior model.

Predicting the future maneuvering of objects. According to a process 400 shown in FIG. 4, the vehicle 10 and its autonomous operation system 20 provide user assistance involving predicting the future maneuvering of objects in the environment surrounding the vehicle 10 by, among other ways, extrapolating the predominating traffic behavior of like populations of reference objects, as described in traffic behavior models.

Figure 5:
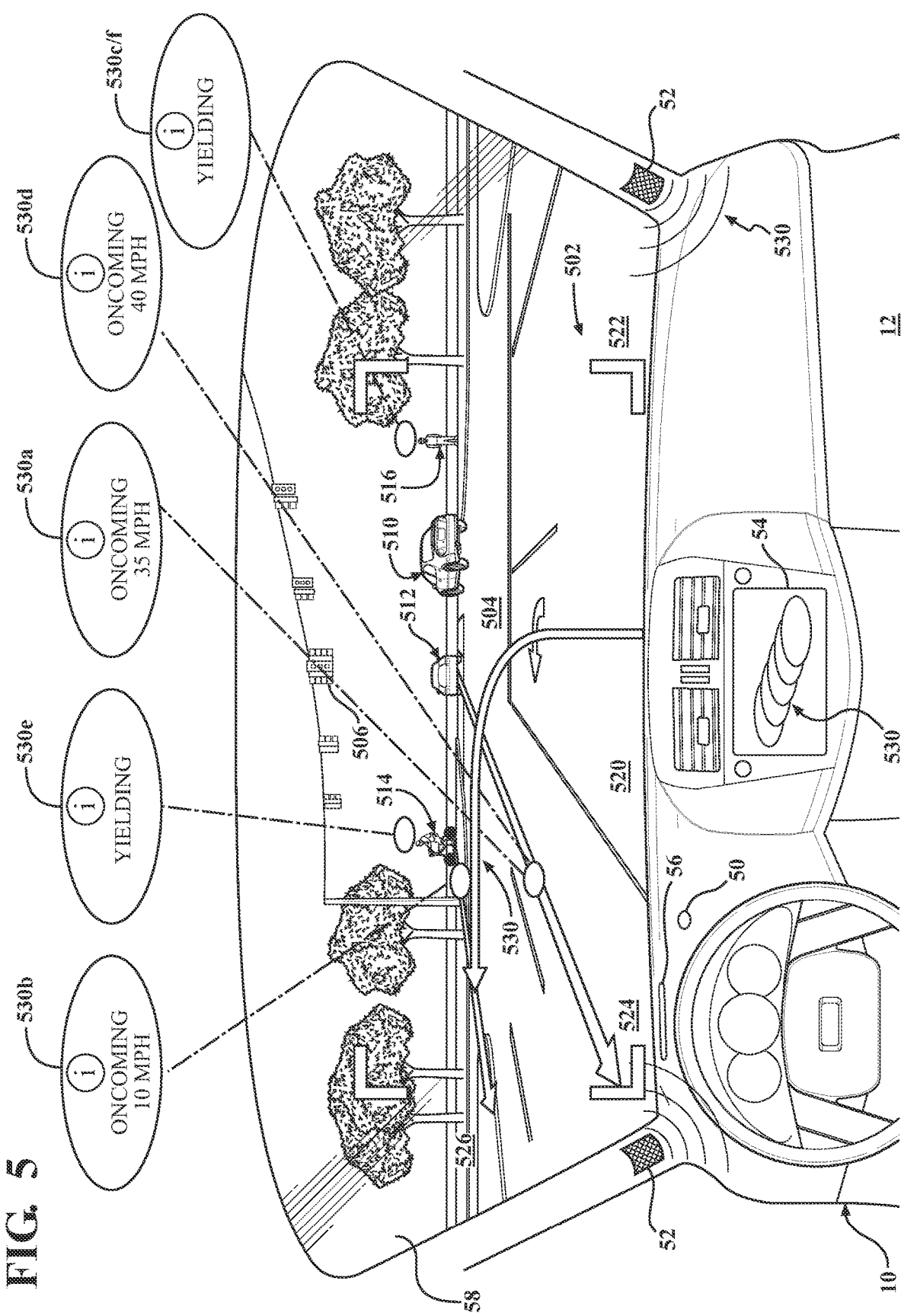
FIG. 5 is an example view of a user of the vehicle out of the vehicle's windshield, showing an example environment surrounding the vehicle, as well as example conceptual renderings of outputs that issue, among other things, alerts to the user according to the process of FIG. 4.

The process 400 is described with reference to FIG. 5. FIG. 5 shows an example perspective view of the user of the vehicle 10 out of its windshield 58, as well as conceptual renderings of outputs to the user at the various interfaces implemented by the components of the audio/video system 46.

As shown in FIG. 5, the vehicle 10 is on a surface-type roadway 502, and is approaching an upcoming intersection 504 controlled by a traffic light 506. The vehicle 10 is maneuvering along the roadway 502 according to a route for the vehicle 10 that dictates the vehicle 10 performing, among other driving maneuvers, current straight ahead driving to approach the intersection 504, and an impending left-hand turn through the intersection 504. The route may, for example, be established by the navigation system 44.

In operation 402, information about the vehicle 10 is detected by the sensor system 60 and its sensors, or is otherwise received, for example from the V2V communication system 76 and digital maps, for gathering and evaluation by the perception module 92.

As the perception module 92 gathers and evaluates information about the operation of the vehicle 10, it may identify the location and motion of the vehicle 10. As the perception module 92 gathers and evaluates information about the environment surrounding the vehicle 10, it may identify, among other objects in the environment surrounding the vehicle 10, the roadway 502 and its intersection 504, the traffic light 506, and obstacles on or around the roadway 502. These obstacles may include other vehicles, such as a vehicle 510 flanking the vehicle 10 and a vehicle 512 in front of the vehicle 10, as well as a bicycle 514 and a pedestrian 516. The perception module 92 may further identify the properties of these and other objects, including their presence, location and motion. For example, among other identifiable properties, the flanking vehicle 510 is moving in the same direction as the vehicle 10 along the roadway 502, while the vehicle 512 is moving in the opposite direction as the vehicle 10 along the roadway 502 and is, accordingly, oncoming. The bicycle 514, similarly to the oncoming vehicle 512, is facing in the opposite direction as the vehicle 10 along the roadway 502, but is stationary. The pedestrian 516 is stationary as well.

The roadway 502 has, among other identifiable features, lane markings. The lane markings mark the outside boundaries of the roadway 502 and the separation of the roadway 502 into a middle section and surrounding sections for traffic moving in opposite directions. The middle section includes a left-hand turn lane position 520 in which the vehicle 10 is located, while the surrounding sections respectively include a lane position 522 in which the flanking vehicle 510 is located, and an oncoming lane position 524 in which the oncoming vehicle 512 is located. The lane markings further mark a crossing lane position 526 for crossing traffic, into which the vehicle 10 must enter as part of its performance of the left-hand turn through the intersection 504. Both the bicycle 514 and the pedestrian 516 are located off the roadway 502 (e.g., on a sidewalk) across the intersection 504 from the vehicle 10. The bicycle 514 is around the section of the roadway 502 for traffic moving in the opposite direction as the vehicle 10, while the pedestrian 516 is around the section of the roadway 502 for traffic moving in the same direction as the vehicle 10. Among identifiable traffic rules, the traffic light 506 dictates that, although the vehicle 10 may left-hand turn through the intersection 504, oncoming traffic, including the oncoming vehicle 512 and the bicycle 514, has priority.

In operation 404, the information about the vehicle 10 is further evaluated by the perception module 92 to identify the traffic behavior of one or more objects in the environment surrounding the vehicle 10. With the vehicle 10 maneuvering along the roadway 502 as shown in FIG. 5, these objects in the environment surrounding the vehicle 10 could include the oncoming vehicle 512, the bicycle 514 and the pedestrian 516. The traffic behavior of the oncoming vehicle 512 is driving behavior, while the traffic behavior of the bicycle 514 is biking behavior, and the traffic behavior of the pedestrian 516 is walking behavior.

With the oncoming vehicle 512, the bicycle 514 and the pedestrian 516 being objects in the environment surrounding the vehicle 10, as part of operation 404, the perception module 92 identifies one or more traffic maneuvers being performed by the these objects. Generally speaking, among other information about the environment surrounding the vehicle 10, the traffic maneuvers being performed by the objects are identified from their location and motion. The identification of the traffic maneuvers being performed by the objects is informed by information sourced from digital maps. This information includes the left-hand turn lane position 520 in which the vehicle 10 is located, the oncoming lane position 524 in which the oncoming vehicle 512 is located, and the crossing lane position 526, among other lane positions, as well as traffic rules including, among others, those dictated by the traffic light 506. Additionally, or alternatively, this information could be sourced from the vehicle 10. The identification of the traffic maneuvers being performed by the objects is further informed by the location and motion of other objects in the environment surrounding the vehicle 10, including other obstacles to them, such as the vehicle 10 itself. With the oncoming vehicle 512 maneuvering along the roadway 502 as shown in FIG. 5, a driving maneuver may, for instance, be its current straight ahead driving to traverse the intersection 504. For the bicycle 514 off the roadway 502, a biking maneuver may, for instance, be its current stationary yielding to traffic in the intersection 504. Similarly, for the pedestrian 516 off the roadway 502, a walking maneuver may, for instance, be its current stationary yielding to traffic in the intersection 504.

Also as part of operation 404, the perception module 92 quantifies attributes of how the objects in the environment surrounding the vehicle 10 perform the traffic maneuvers. These correspond to statistically median or otherwise predominating attributes of how like populations of reference objects perform the traffic maneuvers, as well as the statistically outlying or otherwise atypical attributes of how the like populations of reference objects perform the traffic maneuvers, as described in respective traffic behavior models for the objects generated according to the process 300. For the oncoming vehicle 512, the traffic behavior model describes the predominating driving behavior and the atypical driving behavior of a like population of reference vehicles. For the bicycle 514, the traffic behavior model describes the predominating biking behavior and the atypical biking behavior of a like population of reference bicycles. For the pedestrian 516, the traffic behavior model describes the predominating walking behavior and the atypical walking behavior of a like population of reference pedestrians.

In cases where, in the process 300, the information about the reference objects is sourced from the vehicle 10, operation 302 of the process 300 may be performed in whole or in part in combination with operation 402, and operations 304 and 306 of the process 300 may be performed in whole or in part in combination with operation 404. In these cases, the reference objects may include the flanking vehicle 510, the oncoming vehicle 512, the bicycle 514 and the pedestrian 516. In onboard implementations of the process 300, where the process 300 is performed onboard the vehicle 10, operations 302-312 of the process 300 may be performed, in real-time, in combination with operations 402 and 404, with the reference objects, once again, including the flanking vehicle 510, the oncoming vehicle 512, the bicycle 514 and the pedestrian 516.

In operations 406-410, the planning/decision making module 94, based on the evaluation of the information about the vehicle 10 by the perception module 92, predicts the future maneuvering of the oncoming vehicle 512, the bicycle 514 and the pedestrian 516 along the roadway 502, including their paths (i.e., the driving path of the oncoming vehicle 512, the biking path of the bicycle 514 and the walking path of the pedestrian 516) along the roadway 502.

In operation 406, the planning/decision making module 94 identifies whether the traffic behaviors of the oncoming vehicle 512, the bicycle 514 and the pedestrian 516 are identifiable. Operation 406 may, for instance, implement a confidence threshold that identifiability of the traffic behaviors of the oncoming vehicle 512, the bicycle 514 and the pedestrian 516 must meet for purposes predicting their future maneuvering along the roadway 502 with a certain degree of confidence.

In both operations 408 and 410, the planning/decision making module 94 predicts the future maneuvering of the oncoming vehicle 512, the bicycle 514 and the pedestrian 516 along the roadway 502. If any of their traffic behaviors are not identifiable upon their initial identification and classification, this is done in operation 408 by extrapolating the predominating traffic behavior of the like populations of reference objects, as described in the respective traffic behavior models for the oncoming vehicle 512, the bicycle 514 and the pedestrian 516.

For instance, if the driving behavior of the oncoming vehicle 512 is not identifiable, the planning/decision making module 94 predicts its future maneuvering along the roadway 502 by extrapolating the predominating driving behavior of a like population of reference vehicles, as described in the traffic behavior model for the oncoming vehicle 512. More specifically, the predicted future maneuvering of the oncoming vehicle 512 along the roadway 502 includes one or more predicted driving maneuvers selected from among those performed by the like population of reference vehicles. Moreover, for those predicted driving maneuvers, the predicted future maneuvering of the oncoming vehicle 512 along the roadway 502 includes attributes of how the oncoming vehicle 512 is predicted to perform the driving maneuvers that match corresponding statistically median or otherwise predominating attributes of how the like population of reference vehicles performs the predicted driving maneuvers.

Similarly, if its biking behavior is not identifiable, the planning/decision making module 94 predicts the future maneuvering of the bicycle 514 along the roadway 502 by extrapolating the predominating biking behavior of a like population of reference bicycles, as described in the traffic behavior model for the bicycle 514. The predicted future maneuvering of the bicycle 514 along the roadway 502 includes one or more predicted biking maneuvers selected from among those performed by the like population of reference bicycles. Moreover, for those predicted biking maneuvers, the predicted future maneuvering of the bicycle 514 along the roadway 502 includes attributes of how the bicycle 514 is predicted to perform the biking maneuvers that match corresponding statistically median or otherwise predominating attributes of how the like population of reference bicycles performs the predicted biking maneuvers.

And, if its walking behavior is not identifiable, the planning/decision making module 94 predicts the future maneuvering of the pedestrian 516 along the roadway 502 by extrapolating the predominating walking behavior of a like population of reference pedestrians, as described in the traffic behavior model for the pedestrian 516. The predicted future maneuvering of the pedestrian 516 along the roadway 502 includes one or more predicted walking maneuvers selected from among those performed by the like population of reference pedestrians. Moreover, for those predicted walking maneuvers, the predicted future maneuvering of the pedestrian 516 along the roadway 502 includes attributes of how the pedestrian 516 is predicted to perform the walking maneuvers that match corresponding statistically median or otherwise predominating attributes of how the like population of reference pedestrians performs the predicted walking maneuvers.

If, on the other hand, any of their traffic behaviors are identifiable, the planning/decision making module 94 predicts the future maneuvering of the oncoming vehicle 512, the bicycle 514 and the pedestrian 516 along the roadway 502 by extrapolating their respective traffic behaviors in operation 410. For instance, if the driving behavior of the oncoming vehicle 512 is identifiable, the planning/decision making module 94 predicts its future maneuvering along the roadway 502 by extrapolating its driving behavior. Accordingly, the predicted future maneuvering of the oncoming vehicle 512 along the roadway 502 includes one or more driving maneuvers being performed by the oncoming vehicle 512, as well as attributes of how the oncoming vehicle 512 performs the driving maneuvers.

Similarly, if the biking behavior of the bicycle 514 is identifiable, the planning/decision making module 94 predicts its future maneuvering along the roadway 502 by extrapolating its biking behavior. Accordingly, the predicted future maneuvering of the bicycle 514 along the roadway 502 includes one or more biking maneuvers being performed by the bicycle 514, as well as attributes of how the bicycle 514 performs the biking maneuvers.

And, if the walking behavior of the pedestrian 516 is identifiable, the planning/decision making module 94 predicts its future maneuvering along the roadway 502 by extrapolating its walking behavior. Accordingly, the predicted future maneuvering of the pedestrian 516 along the roadway 502 includes one or more walking maneuvers being performed by the pedestrian 516, as well as attributes of how the pedestrian 516 performs the walking maneuvers.

Regardless of whether any of their traffic behaviors are identifiable upon their initial identification and classification, in operation 412, the vehicle 10 alerts the user of the predicted future maneuvering of the oncoming vehicle 512, the bicycle 514 and the pedestrian 516 along the roadway 502, including the driving path of the oncoming vehicle 512, the biking path of the bicycle 514 and the walking path of the pedestrian 516 along the roadway 502, if applicable.

As shown in FIG. 5, the alerts of the predicted future maneuvering of the oncoming vehicle 512, the bicycle 514 and the pedestrian 516 along the roadway 502 are issued to the user as outputs 530 at the surface of the windshield 58. Accordingly, the planning/decision making module 94 may generate signals representing these things as media transformable into visual outputs that may be projected onto the surface of the windshield 58 by the projector 56 of the audio/video system 46. Although these things are described with reference to the outputs 530 at the surface of the windshield 58, additionally, or alternatively, they could similarly be issued to the user as outputs 530 at the interfaces implemented by the other components of the audio/video system 46, such as its displays 54 and its speakers 52.

As shown with reference to outputs 530a-c, in non-identifiable scenarios, the alerts of the predicted future maneuvering of the oncoming vehicle 512, the bicycle 514 and the pedestrian 516 along the roadway 502 include various notifications. For the oncoming vehicle 512, these include notifications of one or more driving maneuvers selected from among those performed by the like population of reference vehicles, as well as concurrent notifications of attributes of how the oncoming vehicle 512 is predicted to perform the driving maneuvers that match corresponding statistically median or otherwise predominating attributes of how the like population of reference vehicles performs the driving maneuvers. Similarly, for the bicycle 514, these include notifications of one or more biking maneuvers selected from among those performed by the like population of reference bicycles, as well as concurrent notifications of attributes of how the bicycle 514 is predicted to perform the biking maneuvers that match corresponding statistically median or otherwise predominating attributes of how the like population of reference bicycles performs the biking maneuvers. And, for the pedestrian 516, these include notifications of one or more walking maneuvers selected from among those performed by the like population of reference pedestrians, as well as concurrent notifications of attributes of how the pedestrian 516 is predicted to perform the walking maneuvers that match corresponding statistically median or otherwise predominating attributes of how the like population of reference pedestrians performs the walking maneuvers.

With the oncoming vehicle 512 being initially identified as located in the oncoming lane position 524, and classified as a vehicle, as shown with reference to the output 530a, an alert of the predicted future maneuvering of the oncoming vehicle 512 along the roadway 502 may include notifications that straight ahead driving to traverse the intersection 504 is a predicted driving maneuver selected from among those performed by the like population of reference vehicles, and that the predominating speed of the like population of reference vehicles along roadways associated with its performance of straight ahead driving to traverse intersections is thirty-five miles per hour. With the bicycle 514 being initially identified as located off the roadway 502 and facing in the opposite direction as the vehicle 10, and classified as a bicycle, as shown with reference to the output 530b, an alert of the predicted future maneuvering of the bicycle 514 along the roadway 502 may include notifications that straight ahead biking to traverse the intersection 504 is a predicted biking maneuver selected from among those performed by the like population of reference bicycles, and that the predominating speed of the like population of reference bicycles along roadways associated with its performance of straight ahead biking to traverse intersections is ten miles per hour. Concurrent notifications may be included of the driving path of the oncoming vehicle 512 along the roadway 502 included in the predicted future maneuvering of the oncoming vehicle 512, and of the biking path of the bicycle 514 along the roadway 502 included in the predicted future maneuvering of the bicycle 514. With the pedestrian 516 being initially identified as located off the roadway 502, and classified as a pedestrian, as shown with reference to the output 530c, an alert of the predicted future maneuvering of the pedestrian 516 along the roadway 502 may include notifications that stationary yielding to traffic in the intersection 504 is a predicted walking maneuver selected from among those performed by the like population of reference pedestrians. In this case, the walking path of the pedestrian 516 along the roadway 502 is inapplicable.

As shown with reference to outputs 530d-f, in identifiable scenarios, the alerts of the predicted future maneuvering of the oncoming vehicle 512, the bicycle 514 and the pedestrian 516 along the roadway 502 include various notifications analogous to those in non-identifiable scenarios. For the oncoming vehicle 512, these include notifications of one or more driving maneuvers being performed by the oncoming vehicle 512, as well as attributes of how the oncoming vehicle 512 performs the driving maneuvers. Similarly, for the bicycle 514, these include notifications of one or more biking maneuvers being performed by the bicycle 514, as well as attributes of how the bicycle 514 performs the biking maneuvers. And, for the pedestrian 516, these include notifications of one or more walking maneuvers being performed by the pedestrian 516, as well as attributes of how the pedestrian 516 performs the walking maneuvers.

With the current straight ahead driving to traverse the intersection 504 being a driving maneuver being performed by the oncoming vehicle 512, as shown with reference to the output 530d, an alert of the predicted future maneuvering of the oncoming vehicle 512 along the roadway 502 may include notifications that the oncoming vehicle 512 is predicted to consummate the current straight ahead driving to traverse the intersection 504, and that speed of the oncoming vehicle 512 along the roadway 502 associated with its performance of the current straight ahead driving to traverse the intersection 504 is forty miles per hour. Once again, a concurrent notification may be included of the driving path of the oncoming vehicle 512 along the roadway 502 included in the predicted future maneuvering of the oncoming vehicle 512. As shown with reference to the output 530e and the output 530f, alerts of the predicted future maneuvering of the bicycle 514 and the pedestrian 516 along the roadway 502 may include notifications of their current stationary yielding to traffic in the intersection 504. In these cases, the biking path of the bicycle 514 along the roadway 502, and the walking path of the pedestrian 516 along the roadway 502, are inapplicable.

Figure 6:
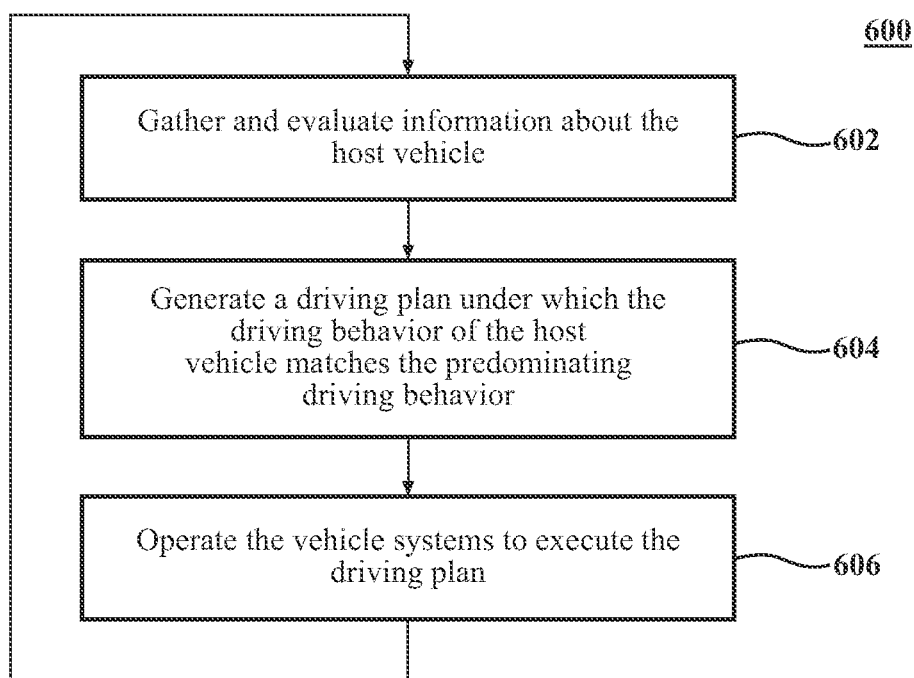
FIG. 6 is a flowchart showing the operations of a process by which the autonomous operation system implements autonomous operation of the vehicle under which its driving behavior matches the predominating driving behavior described in a traffic behavior model.

Matching autonomous operation. According to a process 600 shown in FIG. 6, the vehicle 10 and its autonomous operation system 20 provide user assistance by initiating, maintaining or otherwise implementing autonomous operation of the vehicle 10 under which its driving behavior matches the predominating driving behavior of a like population of reference vehicles, as described in a traffic behavior model.

In operation 602, information about the vehicle 10 is detected by the sensor system 60 and its sensors, or is otherwise received, for example from the V2V communication system 76 and digital maps, for gathering and evaluation by the perception module 92.

In the case of information about the environment surrounding the vehicle 10, the perception module 92 may, as part of its evaluation, identify, among other objects in the environment surrounding the vehicle 10, roadways, as well as any obstacles on or around the roadways, such as other vehicles. In addition to identifying roadways themselves, the perception module 92 may identify their features, such as lane markings, as well as different lane positions. In addition to identifying obstacles themselves, the perception module 92 may identify their properties, such as their presence, location and motion.

In cases where, in the process 300, the information about the reference objects is sourced from the vehicle 10, operation 302 of the process 300 may be performed in whole or in part in combination with operation 602. In these cases, the reference objects may include the identified objects in the environment surrounding the vehicle 10. In onboard implementations of the process 300, where the process 300 is performed onboard the vehicle 10, operations 302-312 of the process 300 may be performed, in real-time, in combination with operation 602, with the reference objects, once again, including the identified objects in the environment surrounding the vehicle 10.

In operation 604, the planning/decision making module 94 generates a driving plan under which the driving behavior of the vehicle 10 matches the predominating driving behavior of a like population of reference vehicles, as described in a traffic behavior model for the vehicle 10 generated according to the process 300. The driving plan is generated based on the traffic behavior model, as well as the evaluation of the information about the vehicle 10 by the perception module 92.

The driving plan is for performing a driving maneuver, which may include any number of sub-driving maneuvers. In order to match the predominating driving behavior, the driving plan is, more specifically, for performing a driving maneuver performed by the like population of reference vehicles, as described in the traffic behavior model. The driving maneuver may be selected from among the driving maneuvers performed by the like population of reference vehicles, for example, or could initially be identified as a candidate and confirmed as being among the driving maneuvers performed by the like population of reference vehicles. In any event, the driving maneuver may be either dictated by a route for the vehicle 10 established by the navigation system 44 or identified based on the evaluation of the information about the vehicle 10 by the perception module 92, or both.

The driving plan describes various things about performing its driving maneuver. These things correspond to the attributes of how the like population of reference vehicles performs the driving maneuver. In order to match the predominating driving behavior, one, some or all of these things, as described in the driving plan, match the statistically median or otherwise predominating corresponding attributes of how the like population of reference vehicles performs the driving maneuver, as described in the traffic behavior model.

Among other things, the driving plan describes the motion of the vehicle 10 along a roadway. Accordingly, part of the driving plan may describe a driving path of the vehicle 10 along a roadway, for instance, that matches the predominating driving path of the like population of reference vehicles along roadways associated with its performance of the driving maneuver. Other parts the driving plan may describe a speed, acceleration and orientation of the vehicle 10 along the roadway, for instance, that match the predominating speed, acceleration and orientation, as the case may be, of the like population of reference vehicles along roadways associated with its performance of the driving maneuver.

The driving plan is also generated based on the information about the environment surrounding the vehicle 10. The driving plan accounts for different lane positions and traffic rules and, accordingly, may describe a lane offset, for instance, that matches the predominating lane offset associated with the performance of the driving maneuver by the like population of reference vehicles. The driving plan also accounts for any objects in the environment surrounding the vehicle 10, as well as their properties. In the case of obstacles on the roadway, the driving plan may accordingly describe a proximity to obstacles on the roadway and an approach to obstacles on the roadway, for instance, that match the predominating proximity to obstacles on roadways and the predominating approach to obstacles on roadways, as the case may be, associated with the performance of the driving maneuver by the like population of reference vehicles.

Additionally, for any objects in the environment surrounding the vehicle 10, and particularly in the case of obstacles on or around the roadway, the driving plan may account for their predicted future maneuvering along the roadway, as predicted according to the process 400. The predicted future maneuvering of an obstacle along the roadway may describe, similarly to a driving plan, the motion of the obstacle along the roadway, including the path of the obstacle along the roadway, as well as the speed, acceleration and orientation of the obstacle along the roadway.

Upon the planning/decision making module 94 generating the driving plan in operation 604, in operation 606, the control module 96 operates the appropriate vehicle systems 30 to execute the driving plan. With the execution of the driving plan, the vehicle 10 is maneuvered according to the driving plan with a driving behavior that matches the predominating driving behavior.

Figure 7:
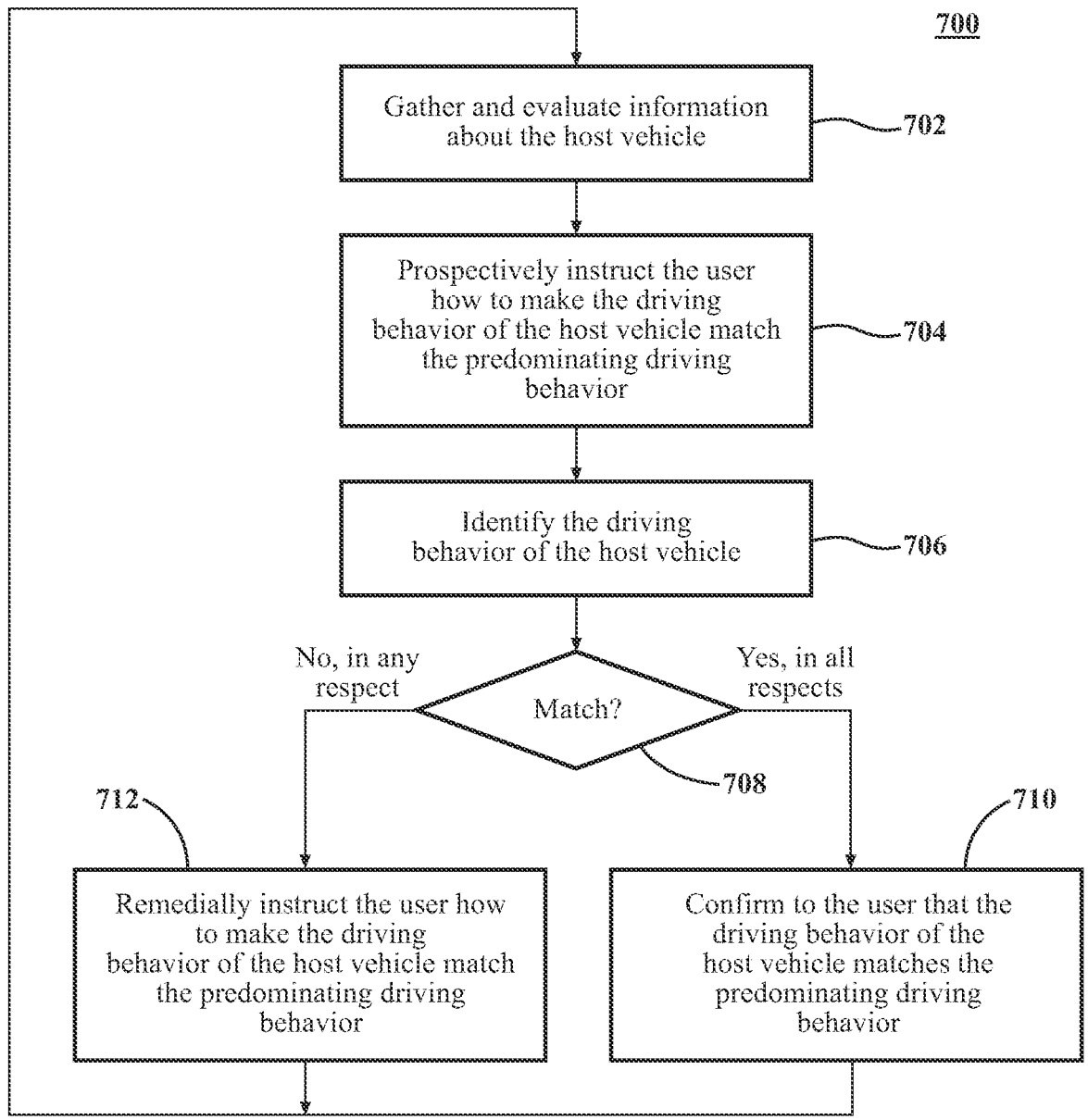
FIG. 7 is a flowchart showing the operations of a process by which the autonomous operation system actively trains a user to implement manual operation of the vehicle under which its driving behavior matches the predominating driving behavior described in a traffic behavior model.

Training for matching manual operation. According to a process 700 shown in FIG. 7, the vehicle 10 and its autonomous operation system 20 provide user assistance by actively training a user to implement manual operation of the vehicle 10 under which its driving behavior matches the predominating driving behavior of a like population of reference vehicles, as described in a traffic behavior model.

Figure 8A:
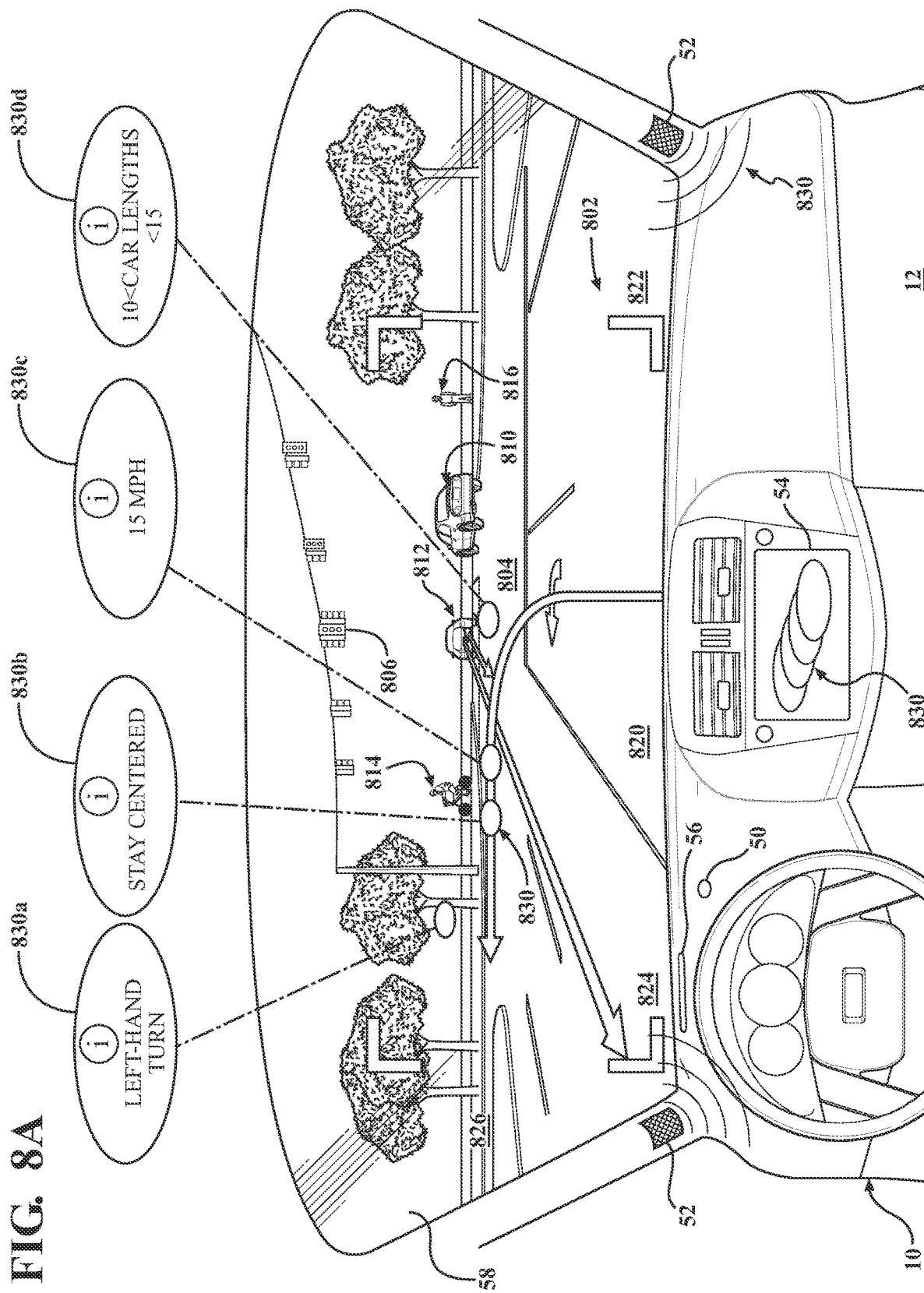
FIG. 8A is an example view of the user of the vehicle out of the vehicle's windshield, showing an example environment surrounding the vehicle, as well as example conceptual renderings of outputs that issue, among other things, prospective instructions to the user according to the process of FIG. 7.
Figure 8B:
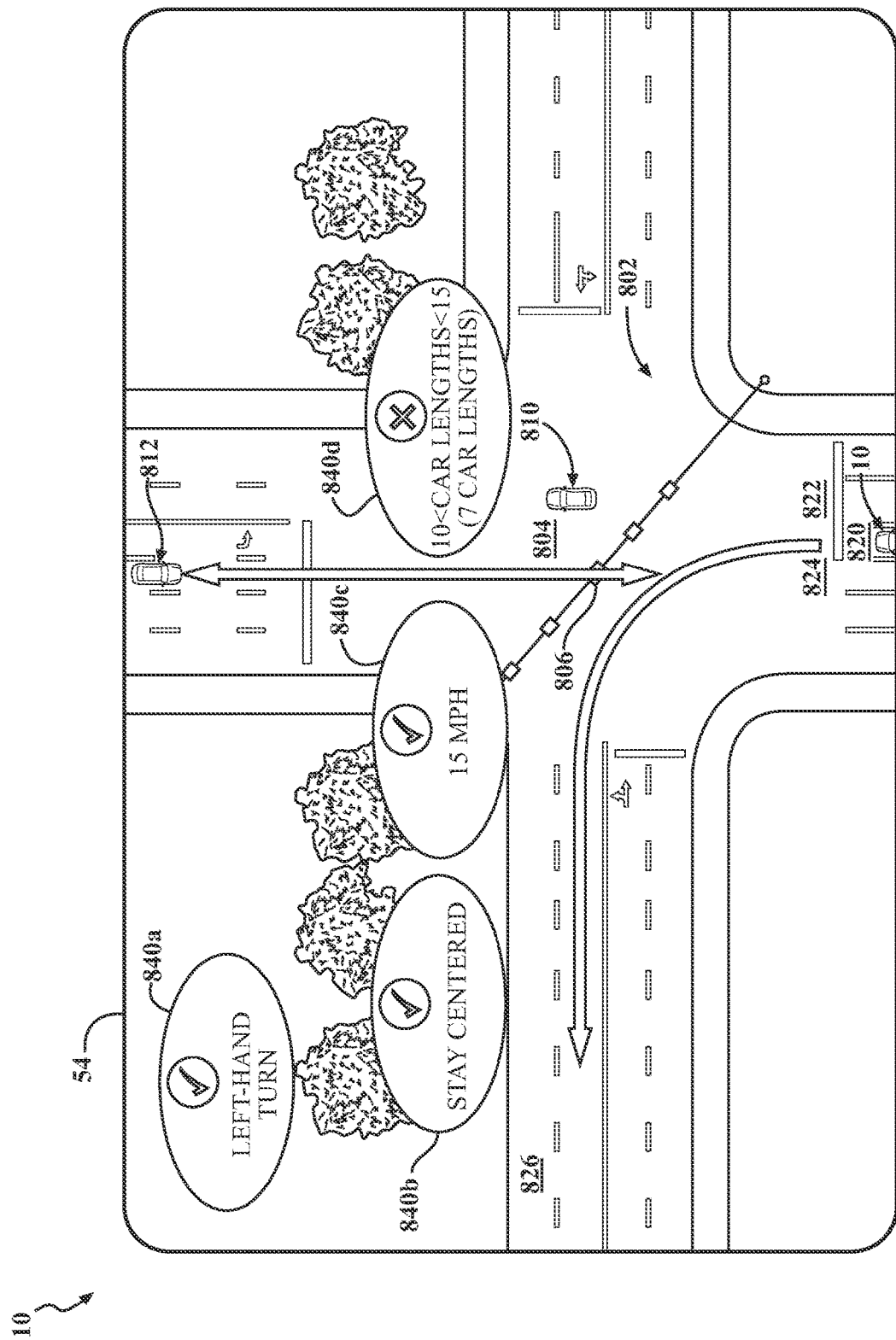
FIG. 8B is an example view of a display in the vehicle, showing example conceptual renderings of outputs that issue, among other things, remedial instructions to the user according to the process of FIG. 7.

The process 700 is described with reference to FIGS. 8A and 8B. FIG. 8A shows an example perspective view of the user of the vehicle 10 out of its windshield 58. Both FIG. 8A and FIG. 8B show conceptual renderings of outputs to the user at the various interfaces implemented by the components of the audio/video system 46.

As shown in FIG. 8A, the vehicle 10 is on a surface-type roadway 802, and is approaching an upcoming intersection 804 controlled by a traffic light 806. The vehicle 10 is maneuvering along the roadway 802 according to a route for the vehicle 10 that dictates the vehicle 10 performing, among other driving maneuvers, current straight ahead driving to approach the intersection 804, and an impending left-hand turn through the intersection 804. The route may, for example, be established by the navigation system 44.

In operation 702, information about the vehicle 10 is detected by the sensor system 60 and its sensors, or is otherwise received, for example from the V2V communication system 76 and digital maps, for gathering and evaluation by the perception module 92.

As the perception module 92 gathers and evaluates information about the operation of the vehicle 10, it may identify the location and motion of the vehicle 10. As the perception module 92 gathers and evaluates information about the environment surrounding the vehicle 10, it may identify, among other objects in the environment surrounding the vehicle 10, the roadway 802 and its intersection 804, the traffic light 806, and obstacles on or around the roadway 802. These obstacles may include other vehicles, such as a vehicle 810 flanking the vehicle 10 and a vehicle 812 in front of the vehicle 10, as well as a bicycle 814 and a pedestrian 816. The perception module 92 may further identify the properties of these and other objects, including their presence, location and motion. For example, among other identifiable properties, the flanking vehicle 810 is moving in the same direction as the vehicle 10 along the roadway 802, while the vehicle 812 is moving in the opposite direction as the vehicle 10 along the roadway 802 and is, accordingly, oncoming. The bicycle 814, similarly to the oncoming vehicle 812, is facing in the opposite direction as the vehicle 10 along the roadway 802, but is stationary. The pedestrian 816 is stationary as well.

The roadway 802 has, among other identifiable features, lane markings. The lane markings mark the outside boundaries of the roadway 802 and the separation of the roadway 802 into a middle section and surrounding sections for traffic moving in opposite directions. The middle section includes a left-hand turn lane position 820 in which the vehicle 10 is located, while the surrounding sections respectively include a lane position 822 in which the flanking vehicle 810 is located, and an oncoming lane position 824 in which the oncoming vehicle 812 is located. The lane markings further mark a crossing lane position 826 for crossing traffic, into which the vehicle 10 must enter as part of its performance of the left-hand turn through the intersection 804. Both the bicycle 814 and the pedestrian 816 are located off the roadway 802 (e.g., on a sidewalk) across the intersection 804 from the vehicle 10. The bicycle 814 is around the section of the roadway 802 for traffic moving in the opposite direction as the vehicle 10, while pedestrian 816 is around the section of the roadway 802 for traffic moving in the same direction as the vehicle 10. Among identifiable traffic rules, the traffic light 806 dictates that, although the vehicle 10 may left-hand turn through the intersection 804, oncoming traffic, including the oncoming vehicle 812 and the bicycle 514, has priority.

In cases where, in the process 300, the information about the reference objects is sourced from the vehicle 10, operation 302 of the process 300 may be performed in whole or in part in combination with operation 702. In these cases, the reference objects may include the flanking vehicle 810, the oncoming vehicle 812, the bicycle 814 and the pedestrian 816. In onboard implementations of the process 300, where the process 300 is performed onboard the vehicle 10, operations 302-312 of the process 300 may be performed, in real-time, in combination with operation 702, with the reference objects, once again, including the flanking vehicle 810, the oncoming vehicle 812, the bicycle 816 and the pedestrian 816.

In operation 704, while the vehicle 10 is in the midst of manual operation, the vehicle 10 prospectively instructs the user how to make the driving behavior of the vehicle 10 match the predominating driving behavior of a like population of reference vehicles, as described in a traffic behavior model for the vehicle 10 generated according to the process 300.

As shown in FIG. 8A, the prospective instructions are issued to the user as outputs 830 at the surface of the windshield 58. Accordingly, the planning/decision making module 94 may generate signals representing the prospective instructions as media transformable into visual outputs that may be projected onto the surface of the windshield 58 by the projector 56 of the audio/video system 46. Although the prospective instructions are described with reference to the outputs 830 at the surface of the windshield 58, additionally, or alternatively, they could similarly be issued to the user as outputs 830 at the interfaces implemented by the other components of the audio/video system 46, such as its displays 54 and its speakers 52.

As part of operation 704, the planning/decision making module 94 identifies an impending driving maneuver as a training driving maneuver. In order to match the predominating driving behavior, the impending training driving maneuver is one performed by the like population of reference vehicles, as described in the traffic behavior model. The impending training driving maneuver may be selected from among the driving maneuvers performed by the like population of reference vehicles, for example, or could initially be identified as a candidate and confirmed as being among the driving maneuvers performed by the like population of reference vehicles. In any event, the impending training driving maneuver may be either dictated by the route for the vehicle 10 established by the navigation system 44 or identified based on the evaluation of the information about the vehicle 10 by the perception module 92, or both. With the vehicle 10 maneuvering along the roadway 802 as shown in FIG. 8A, the impending training driving maneuver may, for instance, be the impending left-hand turn through the intersection 804.

As shown with reference to an output 830a, the prospective instructions include a notification of the impending training driving maneuver. Additionally, as shown with reference to outputs 830b-d, the prospective instructions include concurrent notifications of one, some or all of the statistically median or otherwise predominating attributes of how the like population of reference vehicles performs the impending training driving maneuver, as described in the traffic behavior model.

With the impending left-hand turn through the intersection 804 being the training driving maneuver, as shown with reference to the output 830a, the prospective instructions include a notification of the left-hand turn through the intersection 804. As shown with reference to the output 830b, the prospective instructions may include a notification that the predominating driving path of the like population of reference vehicles along roadways associated with its performance of left-hand turns through intersections is centered. As shown with reference to the output 830c, the prospective instructions may further include a notification that the predominating speed of the like population of reference vehicles along roadways associated with its performance of left-hand turns through intersections is fifteen miles per hour. As shown with reference to the output 830*d*, the prospective instructions may also include a notification that the predominating proximity to oncoming vehicles on roadways associated with the performance of left-hand turns through intersections by the like population of reference vehicles is between ten and fifteen car lengths. The prospective instructions could also include any combination of analogous notifications of other predominating attributes of how the like population of reference vehicles performs the training driving maneuver.

According to the prospective instructions, the user is notified that, in order to make the driving behavior of the vehicle 10 match the predominating driving behavior, the user should implement manual operation of the vehicle 10 under which the left-hand turn through the intersection 804 is performed. The prospective instructions further notify the user that, under the manual operation of the vehicle 10, it should have a driving path along the roadway 802 that stays centered in the left-hand turn lane position 820 and the lane position 826 for crossing traffic, should have a speed of fifteen miles per hour along the roadway 802, and should maintain a proximity to the oncoming vehicle 812 on the roadway 802 between ten and fifteen car lengths.

While the vehicle 10 presumably performs the training driving maneuver in the midst of manual operation, information about the vehicle 10 is gathered for evaluation by the perception module 92, in a continuation of operation 702. In operation 706, this information is evaluated by the perception module 92 to identify the driving behavior of the vehicle 10.

As part of operation 706, the perception module 92 identifies an actual driving maneuver performed by the vehicle 10. Generally speaking, among other information about the vehicle 10, the actual driving maneuver performed by the vehicle 10 is identified from its location and motion, as well as from information about the environment surrounding the vehicle 10. In the case of information about the environment surrounding the vehicle 10, the identification of the actual driving maneuver performed by the vehicle 10 is informed by information sourced from digital maps. This information includes the left-hand turn lane position 820 in which the vehicle 10 is located, the oncoming lane position 824 and the crossing lane position 826, among other lane positions, as well as traffic rules including, among others, those dictated by the traffic light 806. Additionally, or alternatively, this information could be sourced from the vehicle 10. The identification of the actual driving maneuver performed by the vehicle 10 is further informed by the location and motion of objects in the environment surrounding the vehicle 10, including obstacles such as the oncoming vehicle 812, the bicycle 814 and the pedestrian 816.

Also as part of operation 706, the perception module 92 quantifies attributes of how the vehicle 10 performs the actual driving maneuver. These include, at least, those corresponding to the notified predominating attributes of how the like population of reference vehicles performs the training driving maneuver. Accordingly, for the prospective instructions included for the left-hand turn through the intersection 804, the attributes of how the vehicle 10 performs the actual driving maneuver include the driving path of the vehicle 10 along the roadway 802, the speed of the vehicle 10 along the roadway 802 and the proximity to objects on the roadway 802 associated with its performance of the actual driving maneuver. The attributes of how the vehicle 10 performs the actual driving maneuver could further include those corresponding to any combination of other predominating attributes of how the like population of reference vehicles performs the training driving maneuver.

In operation 708, the planning/decision making module 94 identifies whether the driving behavior of the vehicle 10 matches the predominating driving behavior. As part of operation 708, the planning/decision making module 94 identifies whether the actual driving maneuver performed by the vehicle 10 is the same as the training driving maneuver. Also as part of operation 708, the planning/decision making module 94 identifies, on an attribute-by-attribute basis, whether the attributes of how the vehicle 10 performed the actual driving maneuver match the corresponding notified predominating attributes of how the like population of reference vehicles performs the training driving maneuver. For any non-matching attributes of how the vehicle 10 performed the actual driving maneuver, the planning/decision making module 94 may also identify whether they match corresponding atypical attributes of how the like population of reference vehicles performs the training driving maneuver.

If the driving behavior of the vehicle 10 matches the predominating driving behavior in all respects, the vehicle 10 confirms this to the user in operation 710. On the other hand, if the driving behavior of the vehicle 10 does not match the predominating driving behavior in any respect, the vehicle 10, in operation 712, remedially instructs the user how to make the driving behavior of the vehicle 10 match the predominating driving behavior.

As shown in FIG. 8B, both the confirmation and the remedial instructions are issued to the user as outputs 840 at the surface of a representative display 54 of the audio/video system 46. Accordingly, the planning/decision making module 94 may generate signals representing these things as media transformable into visual outputs at the surfaces of the displays 54 of the audio/video system 46. Although these things are described with reference to the outputs 840 at the surface of the displays 54, additionally, or alternatively, they could similarly be issued to the user as outputs 840 at the interfaces implemented by the other components of the audio/video system 46, such as its projector 56 and its speakers 52.

As shown with reference to an output 840*a*, both the confirmation and remedial instructions include a notification of whether the actual driving maneuver performed by the vehicle 10 is the same as the training driving maneuver. Assuming this is the case, as shown with reference to outputs 840*b-d*, both the confirmation and the remedial instructions additionally include concurrent notifications, on an attribute-by-attribute basis, of whether the attributes of how the vehicle 10 performed the actual driving maneuver match the corresponding notified predominating attributes of how the like population of reference vehicles performs the training driving maneuver.

The outputs 840, as a whole, reflect the case where the driving behavior of the vehicle 10 matches the predominating driving behavior in some but not all respects. The outputs 840 accordingly represent various notifications included in the remedial instructions. In the case where the driving behavior of the vehicle 10 matches the predominating driving behavior in all respects, the same or similar outputs 840 could represent analogous notifications included in the confirmation.

With the left-hand turn through the intersection 804 being the training driving maneuver, and with the actual driving maneuver performed by the vehicle 10 being the same as the training driving maneuver, the remedial instructions include a notification that the actual driving maneuver performed by the vehicle 10 is the same as the training driving maneuver, as shown with reference to the output 840a. As shown with reference to the output 840b, the remedial instructions may include a notification that the driving path of the vehicle 10 along the roadway 802 associated with its performance of the left-hand turn through the intersection 804 was centered and, accordingly, matches the predominating driving path of the like population of reference vehicles along roadways associated with its performance of left-hand turns through intersections. As shown with reference to the output 840c, the remedial instructions may further include a notification that the speed of the vehicle 10 along the roadway 802 associated with its performance of the left-hand turn through the intersection 804 was fifteen miles per hour and, accordingly, matches the predominating speed of the like population of reference vehicles along roadways associated with its performance of left-hand turns through intersections. On the other hand, as shown with reference to the output 840d, the remedial instructions may also include a notification that the proximity to the oncoming vehicle 812 on the roadway 802 associated with its performance of the left-hand turn through the intersection 804 was seven car lengths and, accordingly, does not match the predominating proximity to oncoming vehicles on roadways associated with the performance of left-hand turns through intersections by the like population of reference vehicles. The remedial instructions could also include any combination of analogous notifications of attributes of how the vehicle 10 performed the actual driving maneuver corresponding to other predominating attributes of how the like population of reference vehicles performs the training driving maneuver.

According to the remedial instructions, the user is notified that it correctly implemented manual operation of the vehicle 10 under which the left-hand turn through the intersection 804 was performed. The remedial instructions further notify the user that, under the manual operation of the vehicle 10, it correctly had a driving path along the roadway 802 that stayed centered in the left-hand turn lane position 820 and the lane position 826 for crossing traffic, and correctly had a speed of fifteen miles per hour along the roadway 802. The remedial instructions also notify the user that, on the other hand, under the manual operation of the vehicle 10, it should have maintained a proximity to the oncoming vehicle 812 on the roadway 802 between ten and fifteen car lengths.

Figure 9:
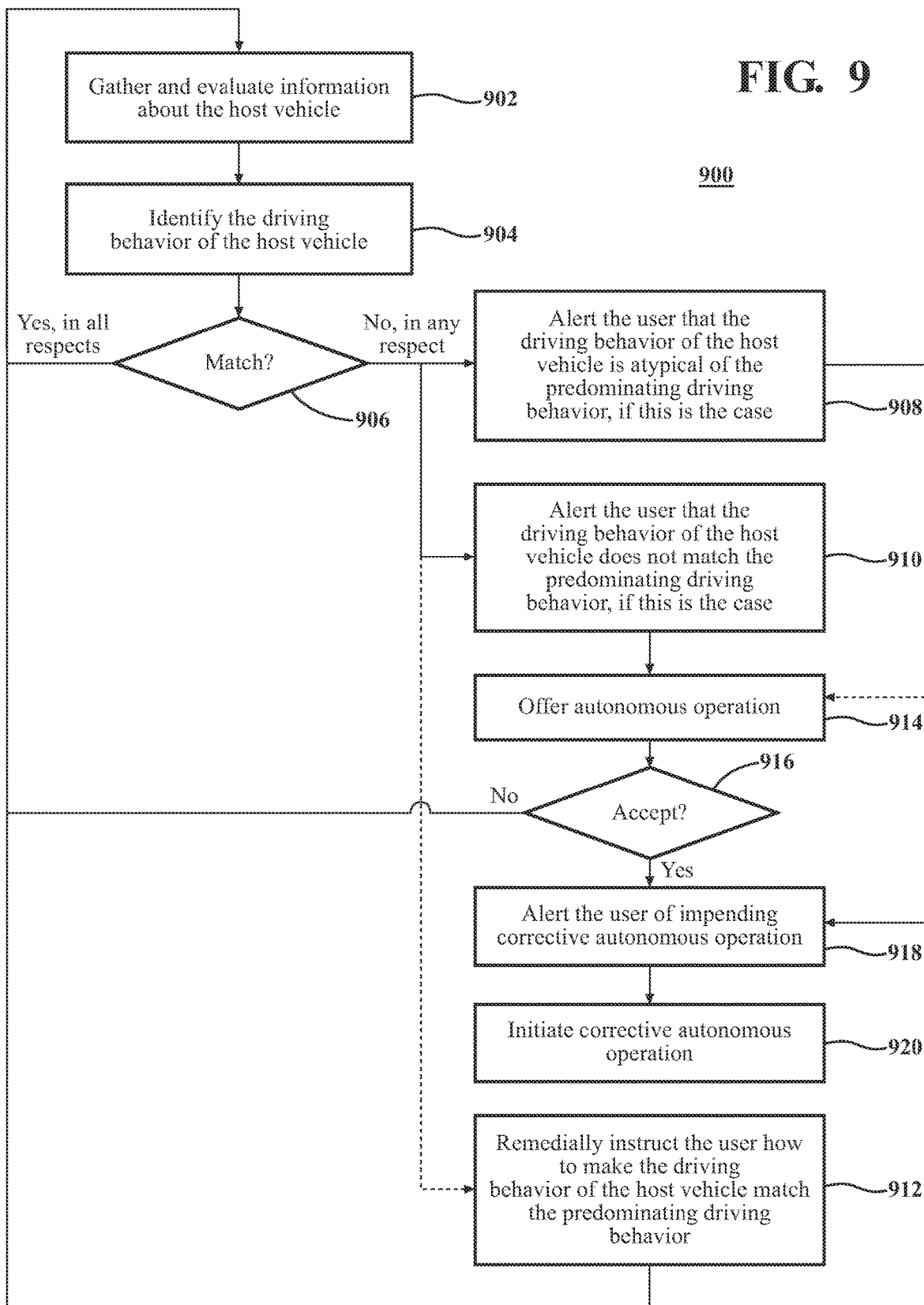
FIG. 9 is a flowchart showing the operations of a process by which the autonomous operation system prompts corrective manual or autonomous operation of the vehicle under which its driving behavior matches the predominating driving behavior described in a traffic behavior model.

Prompting corrective matching manual or autonomous operation. According to a process 900 shown in FIG. 9, the vehicle 10 and its autonomous operation system 20 provide user assistance by prompting corrective manual or autonomous operation of the vehicle 10 under which its driving behavior matches the predominating driving behavior of a like population of reference vehicles, as described in a traffic behavior model.

Figure 11:
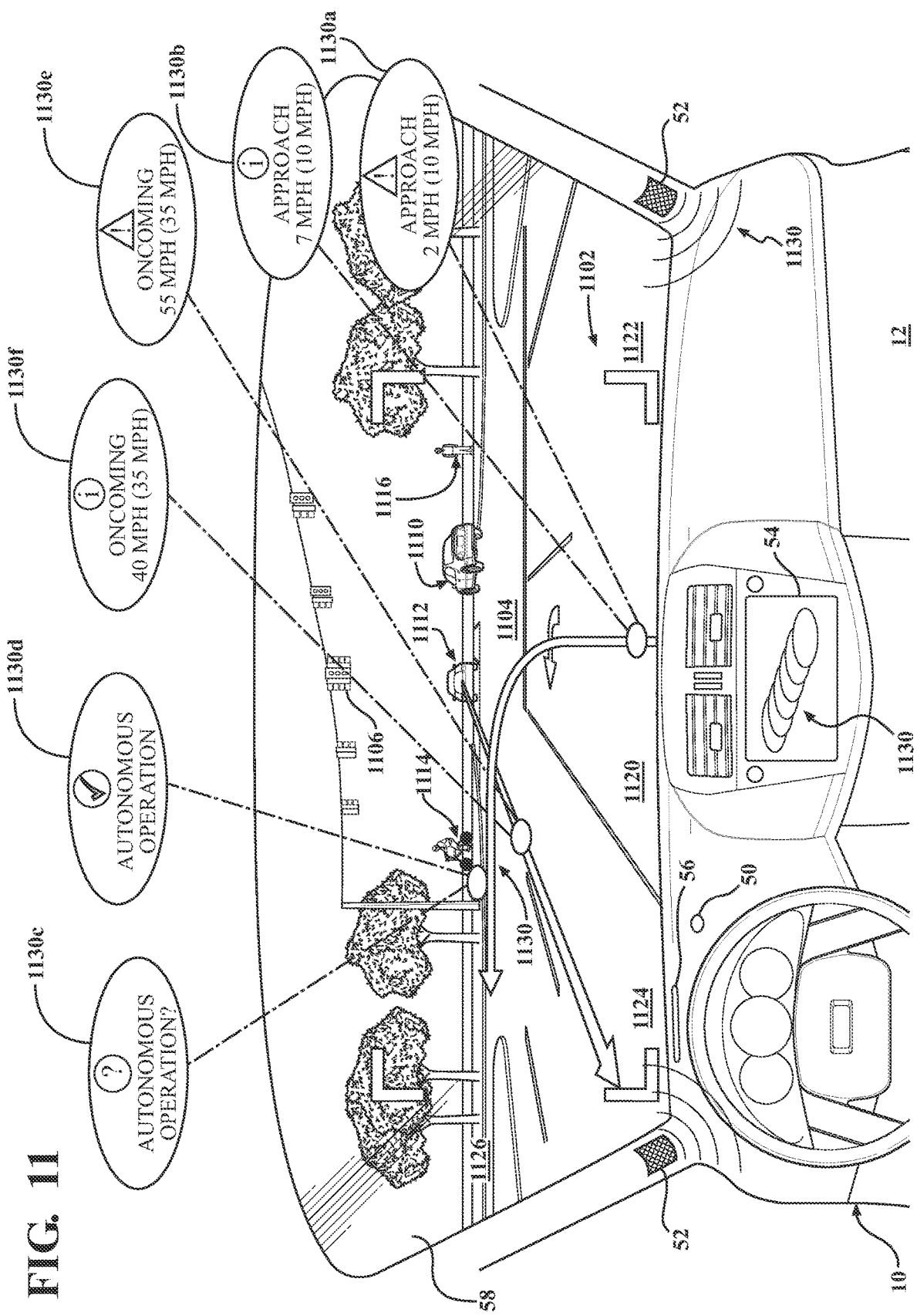
FIG. 11 is an example view of a user of the vehicle out of the vehicle's windshield, showing an example environment surrounding the vehicle, as well as example conceptual renderings of outputs that issue, among other things, various alerts, remedial instructions and offers of autonomous operation to the user according to the processes of FIGS. 9 and 10.

The process 900 is described with reference to FIG. 11. FIG. 11 shows an example perspective view of the user of the vehicle 10 out of its windshield 58. FIG. 11 further shows conceptual renderings of outputs to the user at the various interfaces implemented by the components of the audio/video system 46.

As shown in FIG. 11, the vehicle 10 is on a surface-type roadway 1102, and is approaching an upcoming intersection 1104 controlled by a traffic light 1106. The vehicle 10 is maneuvering along the roadway 1102 according to a route for the vehicle 10 that dictates the vehicle 10 performing, among other driving maneuvers, current straight ahead driving to approach the intersection 1104, and an impending left-hand turn through the intersection 1104. The route may, for example, be established by the navigation system 44.

In operation 902, information about the vehicle 10 is detected by the sensor system 60 and its sensors, or is otherwise received, for example from the V2V communication system 76 and digital maps, for gathering and evaluation by the perception module 92.

As the perception module 92 gathers and evaluates information about the operation of the vehicle 10, it may identify the location and motion of the vehicle 10. As the perception module 92 gathers and evaluates information about the environment surrounding the vehicle 10, it may identify, among other objects in the environment surrounding the vehicle 10, the roadway 1102 and its intersection 1104, the traffic light 1106, and obstacles on or around the roadway 1102. These obstacles may include other vehicles, such as a vehicle 1110 flanking the vehicle 10 and a vehicle 1112 in front of the vehicle 10, as well as a bicycle 1114 and a pedestrian 1116. The perception module 92 may further identify the properties of these and other objects, including their presence, location and motion. For example, among other identifiable properties, the flanking vehicle 1110 is moving in the same direction as the vehicle 10 along the roadway 1102, while the vehicle 1112 is moving in the opposite direction as the vehicle 10 along the roadway 1102 and is, accordingly, oncoming. The bicycle 1114, similarly to the oncoming vehicle 1112, is facing in the opposite direction as the vehicle 10 along the roadway 1102, but is stationary. The pedestrian 1116 is stationary as well.

The roadway 1102 has, among other identifiable features, lane markings. The lane markings mark the outside boundaries of the roadway 1102 and the separation of the roadway 1102 into a middle section and surrounding sections for traffic moving in opposite directions. The middle section includes a left-hand turn lane position 1120 in which the vehicle 10 is located, while the surrounding sections respectively include a lane position 1122 in which the flanking vehicle 1110 is located, and an oncoming lane position 1124 in which the oncoming vehicle 1112 is located. The lane markings further mark a crossing lane position 1126 for crossing traffic, into which the vehicle 10 must enter as part of its performance of the left-hand turn through the intersection 1104. Both the bicycle 1114 and the pedestrian 1116 are located off the roadway 1102 (e.g., on a sidewalk) across the intersection 1104 from the vehicle 10. The bicycle 1114 is around the section of the roadway 1102 for traffic moving in the opposite direction as the vehicle 10, while pedestrian 1116 is around the section of the roadway 1102 for traffic moving in the same direction as the vehicle 10. Among identifiable traffic rules, the traffic light 1106 dictates that, although the vehicle 10 may left-hand turn through the intersection 1104, oncoming traffic, including the oncoming vehicle 1112 and the bicycle 1114, has priority.

In cases where, in the process 300, the information about the reference objects is sourced from the vehicle 10, operation 302 of the process 300 may be performed in whole or in part in combination with operation 902. In these cases, the reference objects may include the flanking vehicle 1110, the oncoming vehicle 1112, the bicycle 1114 and the pedestrian 1116. In onboard implementations of the process 300, where the process 300 is performed onboard the vehicle 10, operations 302-312 of the process 300 may be performed, in real-time, in combination with operation 902, with the reference objects, once again, including the flanking vehicle 1110, the oncoming vehicle 1112, the bicycle 1114 and the pedestrian 1116.

In operation 904, while the vehicle 10 is in the midst of manual operation, the information about the vehicle 10 is further evaluated by the perception module 92 to identify the driving behavior of the vehicle 10.

As part of operation 904, the perception module 92 identifies one or more actual driving maneuvers being performed by the vehicle 10. Generally speaking, among other information about the vehicle 10, the actual driving maneuvers being performed by the vehicle 10 are identified from its location and motion, as well as from information about the environment surrounding the vehicle 10. In the case of information about the environment surrounding the vehicle 10, the identification of the actual driving maneuvers being performed by the vehicle 10 is informed by information sourced from digital maps. This information includes the left-hand turn lane position 1120 in which the vehicle 10 is located, the oncoming lane position 1124 and the crossing lane position 1126, among other lane positions, as well as traffic rules including, among others, those dictated by the traffic light 1106. Additionally, or alternatively, this information could be sourced from the vehicle 10. The identification of the actual driving maneuvers being performed by the vehicle 10 is further informed by the location and motion of objects in the environment surrounding the vehicle 10, including obstacles such as the oncoming vehicle 1112, the bicycle 1114 and the pedestrian 1116. With the vehicle 10 maneuvering along the roadway 1102 as shown in FIG. 11, an actual driving maneuver may, for instance, be the current straight ahead driving to approach the intersection 1104.

Also as part of operation 904, the perception module 92 quantifies attributes of how the vehicle 10 performs the actual driving maneuvers. These correspond to statistically median or otherwise predominating attributes of how the like population of reference vehicles performs the actual driving maneuvers, as well as the statistically outlying or otherwise atypical attributes of how the like population of reference vehicles performs the actual driving maneuvers, as described in a traffic behavior model for the vehicle 10 generated according to the process 300.

In operation 906, the planning/decision making module 94 identifies whether the driving behavior of the vehicle 10 matches the predominating driving behavior. As part of operation 906, the planning/decision making module 94 identifies whether actual driving maneuvers being performed by the vehicle 10 are the same as the driving maneuvers performed by the like population of reference vehicles, as described in the traffic behavior model. Also as part of operation 906, the planning/decision making module 94 identifies, on an attribute-by-attribute basis, whether the attributes of how the vehicle 10 performs the actual driving maneuvers match corresponding predominating attributes of how the like population of reference vehicles performs the driving maneuvers. For any non-matching attributes of how the vehicle 10 performs an actual driving maneuver, the planning/decision making module 94 may also identify whether they match corresponding atypical attributes of how the like population of reference vehicles performs the driving maneuver.

If the driving behavior of the vehicle 10 matches the predominating driving behavior in all respects, the process 900 returns to operation 902. On the other hand, if the driving behavior of the vehicle 10 is atypical of the predominating driving behavior, or otherwise does not match the predominating driving behavior, in any respect, the vehicle 10, in operations 908-912, prompts the user to implement corrective manual operation of the vehicle 10 under which its driving behavior matches the predominating driving behavior of the like population of reference vehicles.

To prompt the user to implement corrective manual operation of the vehicle 10 if its driving behavior is atypical of the predominating driving behavior, the vehicle 10 warns or otherwise alerts the user of this in operation 908. Similarly, in operation 910, if the driving behavior of the vehicle 10 is not atypical of the predominating driving behavior, but otherwise does not match the predominating driving behavior in any respect, the vehicle 10 alerts the user of this to prompt the user to implement corrective operation of the vehicle 10. To further prompt the user to implement corrective operation of the vehicle 10 in either case, as illustrated with a dotted line, optionally, in operation 912, the vehicle 10 may remedially instruct the user how to make the driving behavior of the vehicle 10 match the predominating driving behavior.

As shown in FIG. 11, the alerts and remedial instructions prompting the user to implement corrective manual operation of the vehicle 10 are issued to the user as outputs 1130 at the surface of the windshield 58. Accordingly, the planning/decision making module 94 may generate signals representing these things as media transformable into visual outputs that may be projected onto the surface of the windshield 58 by the projector 56 of the audio/video system 46. Although these things are described with reference to the outputs 1130 at the surface of the windshield 58, additionally, or alternatively, they could similarly be issued to the user as outputs 1130 at the interfaces implemented by the other components of the audio/video system 46, such as its displays 54 and its speakers 52.

Optionally, the alerts and remedial instructions prompting the user to implement corrective manual operation of the vehicle 10 could include a notification of whether the actual driving maneuvers performed by the vehicle 10 are the same as the driving maneuvers performed by the like population of reference vehicles. Assuming this is the case, as shown with reference to outputs 1130a and 1130b, the alerts and remedial instructions prompting the user to implement corrective manual operation of the vehicle 10 include notifications of one, some or all of the attributes of how the vehicle 10 performs the actual driving maneuvers. As additionally shown with reference to outputs 1130a and 1130b, these things also include concurrent notifications, on an attribute-by-attribute basis, that the attributes of how the vehicle 10 performs the actual driving maneuvers match corresponding atypical attributes of how the like population of reference vehicles performs the driving maneuvers, or otherwise do not match corresponding predominating attributes of how the like population of reference vehicles performs the driving maneuvers.

With the current straight ahead driving to approach the intersection 1104 being an actual driving maneuver, in an atypical scenario, as shown with reference to the output 1130a, the alert may include a notification that the speed of the vehicle 10 along the roadway 1102 associated with its performance of the current straight ahead driving to approach the intersection 1104 is two miles per hour and, accordingly, matches an atypical speed of the like population of reference vehicles along roadways associated with its performance of straight ahead driving to approach intersections. In a non-predominating scenario, as shown with reference to the output 1130b, the alert may include a notification that the speed of the vehicle 10 along the roadway 1102 associated with its performance of the current straight ahead driving to approach the intersection 1104 is seven miles per hour and, accordingly, does not match the predominating speed of the like population of reference vehicles along roadways associated with its performance of straight ahead driving to approach intersections. Regardless of the scenario, as shown with reference to both the output 1130a and the output 1130b, the remedial instructions may provide context about the predominating driving behavior by including a concurrent notification that the predominating speed of the like population of reference vehicles along roadways associated with its performance of straight ahead driving to approach intersections is ten miles per hour. The alerts and remedial instructions prompting the user to implement corrective manual operation of the vehicle 10 could also include any combination of analogous notifications of attributes of how the vehicle 10 performs the actual driving maneuvers corresponding to other atypical and predominating attributes of how the like population of reference vehicles performs the driving maneuvers.

According to the alerts and remedial instructions prompting the user to implement corrective manual operation of the vehicle 10, the user is notified that it is not correctly implementing manual operation of the vehicle 10 under which the current straight ahead driving to approach the intersection 1104 is being performed. Instead, depending on the scenario, the alert notifies the user that, under the manual operation of the vehicle 10, it incorrectly has a speed of two miles per hour along the roadway 1102, or the alert notifies the user that, under the manual operation of the vehicle 10, it incorrectly has a speed of seven miles per hour along the roadway 1102. The remedial instructions further notify the user that, under the manual operation of the vehicle 10, it should have a speed of ten miles per hour along the roadway 1102.

In operations 914-920, as compliment to prompting the user to implement corrective manual operation of the vehicle 10, the vehicle 10 prompts its own corrective autonomous operation under which its driving behavior matches the predominating driving behavior of the like population of reference vehicles.

In operation 914, while the vehicle 10 is still in the midst of manual operation, the vehicle 10 makes an offer of autonomous operation under which the current actual driving maneuver being performed by the vehicle 10, as well as impending driving maneuvers, will be performed. Upon posing the offer, the vehicle 10 waits for a user response to the offer. If the user wishes to implement corrective manual operation of the vehicle 10, the user response could be that the user does not accept the offer. If this is the case, the process 900 returns to operation 902. However, if the user wishes for the vehicle 10 to implement corrective autonomous operation of the vehicle 10, the user response will be that the user accepts the offer. If this is the case, the vehicle 10 alerts the user of its impending corrective autonomous operation, in operation 918, and initiates corrective autonomous operation of the vehicle 10, under which the current and impending driving maneuvers are performed according to the process 600, in operation 920. Rather than, as illustrated with a dotted line, making the initiation of corrective autonomous operation of the vehicle 10 conditional on the user accepting an offer of autonomous operation according to operations 914 and 916, the process 900 could automatically proceed to operations 918 and 920 if, for instance, the driving behavior of the vehicle 10 is atypical of the predominating driving behavior.

As shown in FIG. 11, the offer and the alert are issued to the user as outputs 1130 at the surface of the windshield 58. Accordingly, the planning/decision making module 94 may generate signals representing these things as media transformable into visual outputs that may be projected onto the surface of the windshield 58 by the projector 56 of the audio/video system 46. Although these things are described with reference to the outputs 1130 at the surface of the windshield 58, additionally, or alternatively, they could similarly be issued to the user as an output 1130 at the interfaces implemented by the other components of the audio/video system 46, such as its displays 54 and its speakers 52. The user response to the offer of autonomous operation is identified from inputs received from the user at the various interfaces implemented by the components of the audio/video system 46. The planning/decision making module 94 may, for instance, identify the user response to the offer of autonomous operation from input signals transformed from corresponding verbal inputs detected by the microphones 50. Similarly, the planning/decision making module 94 may, for instance, identify the user response to the offer of autonomous operation from input signals transformed from corresponding mechanical inputs detected by touch screens in the displays 54.

As shown with reference to outputs 1130c and 1130d, both the offer and the alert include a notification of one or more impending driving maneuvers that will be performed under the corrective autonomous operation of the vehicle 10. These could also include an analogous notification for the current driving maneuver being performed by the vehicle 10. With the vehicle 10 maneuvering along the roadway 1102 as shown in FIG. 11, an impending driving maneuver may, for instance, be the impending left-hand turn through the intersection 1104. As shown with reference to the output 1130c, the offer may pose the question whether the user wishes for the vehicle 10 to implement corrective autonomous operation of the vehicle 10, while, as shown with reference to the output 1130d, the alert may include a notification that corrective autonomous operation of the vehicle 10 is impending.

Figure 10:
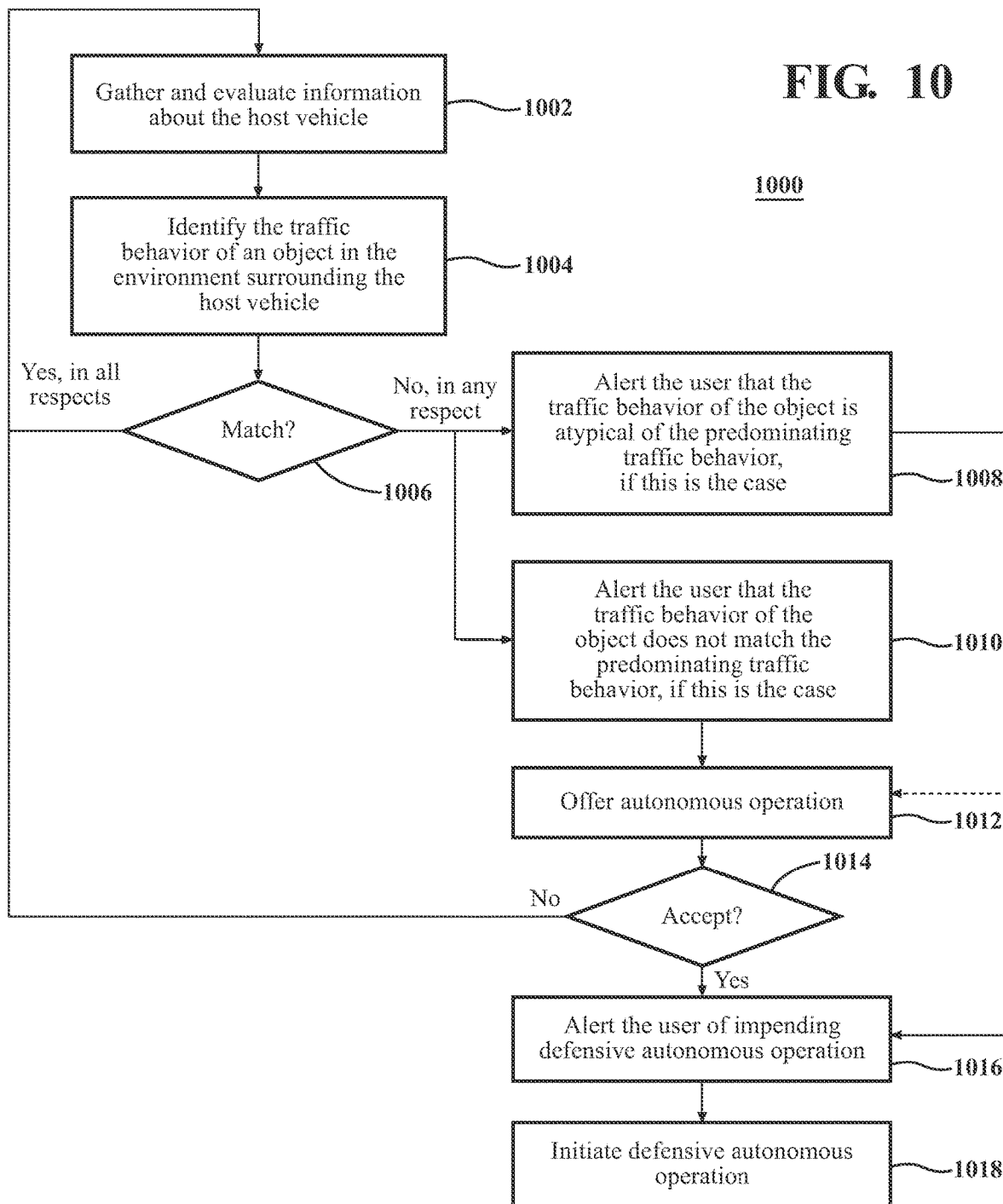
FIG. 10 is a flowchart showing the operations of a process by which the autonomous operation system prompts defensive manual or autonomous operation of the vehicle when the traffic behavior of an object in the environment surrounding the vehicle does not match the predominating traffic behavior described in a traffic behavior model.

Prompting defensive manual or autonomous operation. According to a process 1000 shown in FIG. 10, the vehicle 10 and its autonomous operation system 20 provide user assistance by prompting defensive manual or autonomous operation of the vehicle 10 when the traffic behaviors of objects in the environment surrounding the vehicle 10 do not match the predominating traffic behavior of like populations of reference objects, as described in traffic behavior models.

The process 1000 is, like the process 900, described with reference to FIG. 11, which shows an example perspective view of the user of the vehicle 10 out of its windshield 58, as well as conceptual renderings of outputs to the user at the various interfaces implemented by the components of the audio/video system 46.

In operation 1002, information about the vehicle 10 is detected by the sensor system 60 and its sensors, or is otherwise received, for example from the V2V communication system 76 and digital maps, for gathering and evaluation by the perception module 92, as described with reference to operation 902 of the process 900.

In operation 1004, while the vehicle 10 is in the midst of manual operation, the information about the vehicle 10 is further evaluated by the perception module 92 to identify the traffic behavior of one or more objects in the environment surrounding the vehicle 10. With the vehicle 10 maneuvering along the roadway 1102 as shown in FIG. 11, these objects in the environment surrounding the vehicle 10 could include the oncoming vehicle 1112, the bicycle 1114 and the pedestrian 1116.

With the oncoming vehicle 1112, the bicycle 1114 and the pedestrian 1116 being objects in the environment surrounding the vehicle 10, as part of operation 1004, the perception module 92 identifies one or more traffic maneuvers being performed by these objects. Generally speaking, among other information about the environment surrounding the vehicle 10, the traffic maneuvers being performed by the objects are identified from their location and motion. The identification of the traffic maneuvers being performed by the objects is informed by information sourced from digital maps. This information includes the left-hand turn lane position 1120 in which the vehicle 10 is located, the oncoming lane position 1124 in which the oncoming vehicle 1112 is located, and the crossing lane position 1126, among other lane positions, as well as traffic rules including, among others, those dictated by the traffic light 1106. Additionally, or alternatively, this information could be sourced from the vehicle 10. The identification of the traffic maneuvers being performed by the objects is further informed by the location and motion of other objects in the environment surrounding the vehicle 10, including other obstacles to them, such as the vehicle 10 itself. With the oncoming vehicle 1112 maneuvering along the roadway 1102 as shown in FIG. 11, a driving maneuver may, for instance, be its current straight ahead driving to traverse the intersection 1104. For the bicycle 1114 off the roadway 1102, a biking maneuver may, for instance, be its current stationary yielding to traffic in the intersection 1104. Similarly, for the pedestrian 1116 off the roadway 1102, a walking maneuver may, for instance, be its current stationary yielding to traffic in the intersection 1104.

Also as part of operation 1004, the perception module 92 quantifies attributes of how the objects in the environment surrounding the vehicle 10 perform the traffic maneuvers. These correspond to statistically median or otherwise predominating attributes of how like populations of reference objects performs the traffic maneuvers, as well as the statistically outlying or otherwise atypical attributes of how the like populations of reference objects perform the traffic maneuvers, as described in respective traffic behavior models for the objects generated according to the process 300. For the oncoming vehicle 1112, for instance, the traffic behavior model describes the predominating driving behavior and the atypical driving behavior of a like population of reference vehicles.

The process 1000 is applicable in principle to any objects in the environment surrounding the vehicle 10 for which traffic behavior models have been generated according to the process 300. In addition to the oncoming vehicle 1112, these objects include the bicycle 1114 and the pedestrian 1116. However, due to their current stationary yielding to traffic in the intersection 1104, the bicycle 1114 and the pedestrian 1116 are not of interest to the vehicle 10 for purposes of prompting its defensive manual or autonomous operation. Accordingly, remainder of the process 1000 is described with reference to the oncoming vehicle 1112 and the traffic behavior model generated for it.

In cases where, in the process 300, the information about the reference objects is sourced from the vehicle 10, operation 302 of the process 300 may be performed in whole or in part in combination with operation 1002, and operations 304 and 306 of the process 300 may be performed in whole or in part in combination with operation 1004. In these cases, the reference objects may include the flanking vehicle 1110, the oncoming vehicle 1112, the bicycle 1114 and the pedestrian 1116. In onboard implementations of the process 300, where the process 300 is performed onboard the vehicle 10, operations 302-312 of the process 300 may be performed, in real-time, in combination with operations 1002 and 1004, with the reference objects, once again, including the flanking vehicle 1110, the oncoming vehicle 1112, the bicycle 1114 and the pedestrian 1116.

In operation 1006, the planning/decision making module 94 identifies whether the driving behavior of the oncoming vehicle 1112 matches the predominating driving behavior.

As part of operation 1006, the planning/decision making module 94 identifies whether the driving maneuvers being performed by the oncoming vehicle 1112 are the same as the driving maneuvers performed by the like population of reference vehicles, as described in the traffic behavior model. Also as part of operation 1006, the planning/decision making module 94 identifies, on an attribute-by-attribute basis, whether the attributes of how the oncoming vehicle 1112 performs the driving maneuvers match corresponding predominating attributes of how the like population of reference vehicles performs the driving maneuvers. For any non-matching attributes of how the oncoming vehicle 1112 performs a driving maneuver, the planning/decision making module 94 may also identify whether they match corresponding atypical attributes of how the like population of reference vehicles performs the driving maneuver.

If the driving behavior of the oncoming vehicle 1112 matches the predominating driving behavior in all respects, the process 1000 returns to operation 1002. On the other hand, if the driving behavior of the oncoming vehicle 1112 is atypical of the predominating driving behavior, or otherwise does not match the predominating driving behavior, in any respect, the vehicle 10, in operations 1008 and 1010, prompts the user to implement defensive manual operation of the vehicle 10 under which the driving behavior of the oncoming vehicle 1112 is addressed.

To prompt the user to implement defensive manual operation of the vehicle 10 if the driving behavior of the oncoming vehicle 1112 is atypical of the predominating driving behavior, the vehicle 10 warns or otherwise alerts the user of this in operation 1008. Similarly, in operation 1010, if the driving behavior of the oncoming vehicle 1112 is not atypical of the predominating driving behavior, but otherwise does not match the predominating driving behavior in any respect, the vehicle 10 alerts the user of this to prompt the user to implement defensive manual operation of the vehicle 10.

As shown in FIG. 11, the alerts prompting the user to implement defensive manual operation of the vehicle 10 are issued to the user as outputs 1130 at the surface of the windshield 58. Accordingly, the planning/decision making module 94 may generate signals representing these things as media transformable into visual outputs that may be projected onto the surface of the windshield 58 by the projector 56 of the audio/video system 46. Although these things are described with reference to the outputs 1130 at the surface of the windshield 58, additionally, or alternatively, they could similarly be issued to the user as outputs 1130 at the interfaces implemented by the other components of the audio/video system 46, such as its displays 54 and its speakers 52.

Optionally, the alerts prompting the user to implement defensive manual operation of the vehicle 10 could include a notification of whether the driving maneuvers performed by the oncoming vehicle 1112 are the same as the driving maneuvers performed by the like population of reference vehicles. Assuming this is the case, as shown with reference to outputs 1130e and 1130f, the alerts prompting the user to implement defensive manual operation of the vehicle 10 include notifications of one, some or all of the attributes of how the oncoming vehicle 1112 performs the driving maneuvers. As additionally shown with reference to outputs 1130e and 1130f, these things also include concurrent notifications, on an attribute-by-attribute basis, that the attributes of how the oncoming vehicle 1112 performs the driving maneuvers match corresponding atypical attributes of how the like population of reference vehicles performs the driving maneuvers, or otherwise do not match corresponding predominating attributes of how the like population of reference vehicles performs the driving maneuvers.

With the current straight ahead driving to traverse the intersection 1104 being a driving maneuver, in an atypical scenario, as shown with reference to the output 1130e, the alert may include a notification that the speed of the oncoming vehicle 1112 along the roadway 1102 associated with its performance of the current straight ahead driving to traverse the intersection 1104 is fifty-five miles per hour and, accordingly, matches an atypical speed of the like population of reference vehicles along roadways associated with its performance of straight ahead driving to traverse intersections. In a non-predominating scenario, as shown with reference to the output 1130f, the alert may include a notification that the speed of the oncoming vehicle 1112 along the roadway 1102 associated with its performance of the current straight ahead driving to traverse the intersection 1104 is forty miles per hour and, accordingly, does not match the predominating speed of the like population of reference vehicles along roadways associated with its performance of straight ahead driving to traverse intersections. Regardless of the scenario, a concurrent notification may be included of the predicted future maneuvering of the oncoming vehicle 1112 along the roadway 1102, as predicted according to the process 400. Also, as shown with reference to both the output 1130e and the output 1130f, to provide context about the predominating driving behavior, a concurrent notification may be included that the predominating speed of the like population of reference vehicles along roadways associated with its performance of straight ahead driving to traverse intersections is thirty-five miles per hour. The alerts prompting the user to implement defensive manual operation of the vehicle 10 could also include any combination of analogous notifications of attributes of how the oncoming vehicle 1112 performs the driving maneuvers corresponding to other atypical and predominating attributes of how the like population of reference vehicles performs the driving maneuvers.

According to the alerts prompting the user to implement defensive manual operation of the vehicle 10, the user is notified that the oncoming vehicle 1112 is not correctly implementing operation of the oncoming vehicle 1112 under which the current straight ahead driving to traverse the intersection 1104 is being performed. Instead, depending on the scenario, the alert notifies the user that, under the operation of the oncoming vehicle 1112, it incorrectly has a speed of fifty-five miles per hour along the roadway 1102, or the alert notifies the user that, under the operation of the oncoming vehicle 1112, it incorrectly has a speed of forty miles per hour along the roadway 1102. The user is also notified of the predicted future maneuvering of the oncoming vehicle 1112 along the roadway 1102. For context, the user is further notified the user that, under the operation of the oncoming vehicle 1112, it should have a speed of thirty-five miles per hour along the roadway 1102.

In operations 1012-1018, as compliment to prompting the user to implement defensive manual operation of the vehicle 10, the vehicle 10 prompts its own defensive autonomous operation under which the driving behavior of the oncoming vehicle 1112 is addressed.

In operation 1012, while the vehicle 10 is still in the midst of manual operation, the vehicle 10 makes an offer of autonomous operation under which the current driving maneuver being performed by the vehicle 10, as well as impending driving maneuvers, will be performed. Upon posing the offer, the vehicle 10 waits for a user response to the offer. If the user wishes to implement defensive manual operation of the vehicle 10, the user response could be that the user does not accept the offer. If this is the case, the process 1000 returns to operation 1002. However, if the user wishes for the vehicle 10 to implement defensive autonomous operation of the vehicle 10, the user response will be that the user accepts the offer. If this is the case, the vehicle 10 alerts the user of its impending defensive autonomous operation, in operation 1016, and initiates defensive autonomous operation of the vehicle 10 under which the current and impending driving maneuvers are performed, for instance according to the process 600, or another process tailored to defensive autonomous operation, in operation 1018. In operation 1018, the current and impending driving maneuvers may be performed according to the process 600. Rather than, as illustrated with a dotted line, making the initiation of defensive autonomous operation of the vehicle 10 conditional on the user accepting an offer of autonomous operation according to operations 1012 and 1014, the process 1000 could directly proceed to operations 1016 and 1018 if, for instance, the driving behavior of the oncoming vehicle 1112 is atypical of the predominating driving behavior.

As shown in FIG. 11, the offer and the alert are issued to the user as outputs 1130 at the surface of the windshield 58. Accordingly, the planning/decision making module 94 may generate signals representing these things as media transformable into visual outputs that may be projected onto the surface of the windshield 58 by the projector 56 of the audio/video system 46. Although these things are described with reference to the outputs 1130 at the surface of the windshield 58, additionally, or alternatively, they could similarly be issued to the user as an output 1130 at the interfaces implemented by the other components of the audio/video system 46, such as its displays 54 and its speakers 52. The user response to the offer of autonomous operation is identified from inputs received from the user at the various interfaces implemented by the components of the audio/video system 46. The planning/decision making module 94 may, for instance, identify the user response to the offer of autonomous operation from input signals transformed from corresponding verbal inputs detected by the microphones 50. Similarly, the planning/decision making module 94 may, for instance, identify the user response to the offer of autonomous operation from input signals transformed from corresponding mechanical inputs detected by touch screens in the displays 54.

As shown with reference to outputs 1130c and 1130d, both the offer and the alert include a notification of one or more impending driving maneuvers that will be performed under the defensive autonomous operation of the vehicle 10. These could also include an analogous notification for the current driving maneuver being performed by the vehicle 10. With the vehicle 10 maneuvering along the roadway 1102 as shown in FIG. 11, an impending driving maneuver may, for instance, be the impending left-hand turn through the intersection 1104. As shown with reference to the output 1130c, the offer may pose the question whether the user wishes for the vehicle 10 to implement defensive autonomous operation of the vehicle 10, while, as shown with reference to the output 1130d, the alert may include a notification that defensive autonomous operation of the vehicle 10 is impending.

While recited characteristics and conditions of the invention have been described in connection with certain embodiments, it is to be understood that the invention is not to be limited to the disclosed embodiments but, on the contrary, is intended to cover various modifications and equivalent arrangements included within the spirit and scope of the appended claims, which scope is to be accorded the broadest interpretation so as to encompass all such modifications and equivalent structures as is permitted under the law.

What is claimed is:

1. A vehicle, comprising:
   at least one processor; and
   a memory communicably coupled to the at least one processor and storing instructions that when executed by the at least one processor cause the at least one processor to:
      evaluate information about manual operation of the vehicle and information about an environment surrounding the vehicle;
      quantify, based on the evaluation of the information about the manual operation of the vehicle and the information about the environment surrounding the vehicle, an attribute of how the vehicle performs a driving maneuver;
      receive a traffic behavior model that describes a statistically median attribute of how a population of reference vehicles performs the driving maneuver; and
      in response to identifying that the attribute of how the vehicle performs the driving maneuver does not match the statistically median attribute of how the population of reference vehicles performs the driving maneuver:
         operate at least one interface in the vehicle to issue an alert to a user prompting the user to implement corrective manual operation under which the attribute of how the vehicle performs the driving maneuver matches the statistically median attribute of how the population of reference vehicles performs the driving maneuver.

2. The vehicle of claim 1, wherein evaluating information about the environment surrounding the vehicle includes:
   identifying driving maneuvers performed by reference vehicles in the environment surrounding the vehicle, and quantifying attributes of how the reference vehicles perform the driving maneuvers;
   identifying the population of reference vehicles from among the reference vehicles;
   identifying the statistically median attribute of how the population of reference vehicles performs the driving maneuver; and
   generating the traffic behavior model that describes the statistically median attribute of how the population of reference vehicles performs the driving maneuver.

3. The vehicle of claim 1, wherein the memory includes instructions that when executed by the at least one processor cause the at least one processor to, in response to identifying that the attribute of how the vehicle performs the driving maneuver does not match the statistically median attribute of how the population of reference vehicles performs the driving maneuver:
   operate the at least one interface to issue remedial instructions to the user on how to make the attribute of how the vehicle performs the driving maneuver match the statistically median attribute of how the population of reference vehicles performs the driving maneuver.

4. The vehicle of claim 1, wherein:
   the traffic behavior model describes driving maneuvers performed by the population of reference vehicles, and statistically median attributes of how the population of reference vehicles performs the driving maneuvers; and
   the memory includes instructions that when executed by the at least one processor cause the at least one processor to identify that the driving maneuver is among the driving maneuvers performed by the population of reference vehicles, but the attribute of how the vehicle performs the driving maneuver does not match a corresponding statistically median attribute of how the population of reference vehicles performs the driving maneuver.

5. The vehicle of claim 1, wherein the alert to a user prompting the user to implement corrective manual operation under which the attribute of how the vehicle performs the driving maneuver matches the statistically median attribute of how the population of reference vehicles performs the driving maneuver includes a notification that the attribute of how the vehicle performs the driving maneuver does not match the statistically median attribute of how the population of reference vehicles performs the driving maneuver.

6. The vehicle of claim 1, wherein the population of reference vehicles includes reference vehicles maneuvering on roadways at least one of in a same location as the vehicle, at a same time of day as the vehicle, under a same roadway condition as the vehicle, under a same traffic condition as the vehicle, and under a same weather condition as the vehicle.

7. The vehicle of claim 6, wherein the population of reference vehicles includes the reference vehicles maneuvering on roadways in the same location as the vehicle.

8. The vehicle of claim 6, wherein the population of reference vehicles includes the reference vehicles maneuvering on roadways at least one of at the same time of day as the vehicle, under the same roadway condition as the vehicle, under the same traffic condition as the vehicle, and under the same weather condition as the vehicle.

9. The vehicle of claim 6, wherein the population of reference vehicles includes the reference vehicles maneuvering on roadways in the same location as the vehicle, and at least one of at the same time of day as the vehicle, under the same roadway condition as the vehicle, under the same traffic condition as the vehicle, and under the same weather condition as the vehicle.

10. A method of providing user assistance in a vehicle, comprising:
    evaluating, using at least one processor, information about manual operation of the vehicle and information about an environment surrounding the vehicle;
    quantifying, using the at least one processor, based on the evaluation of the information about the manual operation of the vehicle and the information about the environment surrounding the vehicle, an attribute of how the vehicle performs a driving maneuver;
    receiving, using the at least one processor, a traffic behavior model that describes a statistically median attribute of how a population of reference vehicles performs the driving maneuver; and
    in response to identifying, using the at least one processor, that the attribute of how the vehicle performs the driving maneuver does not match the statistically median attribute of how the population of reference vehicles performs the driving maneuver:

operating, using the at least one processor, at least one interface in the vehicle to issue an alert to a user prompting the user to implement corrective manual operation under which the attribute of how the vehicle performs the driving maneuver matches the statistically median attribute of how the like population of reference vehicles performs the driving maneuver.

11. The method of claim 10, wherein evaluating information about the environment surrounding the vehicle includes:
identifying driving maneuvers performed by reference vehicles in the environment surrounding the vehicle, and quantifying attributes of how the reference vehicles perform the driving maneuvers;
identifying the population of reference vehicles from among the reference vehicles;
identifying the statistically median attribute of how the population of reference vehicles performs the driving maneuver; and
generating the traffic behavior model that describes the statistically median attribute of how the population of reference vehicles performs the driving maneuver.

12. The method of claim 10, further comprising:
in response to identifying that the attribute of how the vehicle performs the driving maneuver does not match the statistically median attribute of how the population of reference vehicles performs the driving maneuver:
operating, using the at least one processor, the at least one interface to issue remedial instructions to the user on how to make the attribute of how the vehicle performs the driving maneuver match the statistically median attribute of how the population of reference vehicles performs the driving maneuver.

13. The method of claim 10, wherein the traffic behavior model describes driving maneuvers performed by the population of reference vehicles, and statistically median attributes of how the population of reference vehicles performs the driving maneuvers, further comprising:
identifying, using the at least one processor, that the driving maneuver is among the driving maneuvers performed by the population of reference vehicles, but the attribute of how the vehicle performs the driving maneuver does not match a corresponding statistically median attribute of how the population of reference vehicles performs the driving maneuver.

14. The method of claim 10, wherein the alert to a user prompting the user to implement corrective manual operation under which the attribute of how the vehicle performs the driving maneuver matches the statistically median attribute of how the population of reference vehicles performs the driving maneuver includes a notification that the attribute of how the vehicle performs the driving maneuver does not match the statistically median attribute of how the population of reference vehicles performs the driving maneuver.

15. The method of claim 10, wherein the population of reference vehicles includes reference vehicles maneuvering on roadways at least one of in a same location as the vehicle, at a same time of day as the vehicle, under a same roadway condition as the vehicle, under a same traffic condition as the vehicle, and under a same weather condition as the vehicle.

16. The method of claim 15, wherein the population of reference vehicles includes the reference vehicles maneuvering on roadways in the same location as the vehicle.

17. The method of claim 15, wherein the population of reference vehicles includes the reference vehicles maneuvering on roadways at least one of at the same time of day as the vehicle, under the same roadway condition as the vehicle, under the same traffic condition as the vehicle, and under the same weather condition as the vehicle.

18. The method of claim 15, wherein the population of reference vehicles includes the reference vehicles maneuvering on roadways in the same location as the vehicle, and at least one of at the same time of day as the vehicle, under the same roadway condition as the vehicle, under the same traffic condition as the vehicle, and under the same weather condition as the vehicle.

* * * * *

UNITED STATES PATENT AND TRADEMARK OFFICE
CERTIFICATE OF CORRECTION

| | |
|---|---|
| PATENT NO. | : 11,315,418 B2 |
| APPLICATION NO. | : 16/527911 |
| DATED | : April 26, 2022 |
| INVENTOR(S) | : Kuffner, Jr. |

It is certified that error appears in the above-identified patent and that said Letters Patent is hereby corrected as shown below:

In the Claims

Column 43, Lines 6-7: replace "likc population of reference vehicles" with --population of reference vehicles--

Signed and Sealed this
Seventh Day of November, 2023

*Katherine Kelly Vidal*
Katherine Kelly Vidal
*Director of the United States Patent and Trademark Office*